(12) United States Patent
Jayawardene et al.

(10) Patent No.: US 11,716,558 B2
(45) Date of Patent: *Aug. 1, 2023

(54) APPARATUS AND METHODS FOR INTEGRATED HIGH-CAPACITY DATA AND WIRELESS NETWORK SERVICES

(71) Applicant: CHARTER COMMUNICATIONS OPERATING, LLC, St. Louis, MO (US)

(72) Inventors: Diwelawatte Jayawardene, Aurora, CO (US); Manish Jindal, Centennial, CO (US); Pratik Das, Centennial, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 681 days.

This patent is subject to a terminal disclaimer.

(21) Appl. No.: 16/216,835

(22) Filed: Dec. 11, 2018

(65) Prior Publication Data

US 2019/0320322 A1 Oct. 17, 2019

Related U.S. Application Data

(60) Provisional application No. 62/658,465, filed on Apr. 16, 2018.

(51) Int. Cl.
*H04W 72/04* (2023.01)
*H04Q 11/02* (2006.01)
(Continued)

(52) U.S. Cl.
CPC ............ *H04Q 11/02* (2013.01); *H04J 3/1652* (2013.01); *H04L 5/0007* (2013.01);
(Continued)

(58) Field of Classification Search
None
See application file for complete search history.

(56) References Cited

U.S. PATENT DOCUMENTS 5,742,583 A  4/1998 Scott
6,542,739 B1  4/2003 Garner
(Continued)

FOREIGN PATENT DOCUMENTS

CA  3097121 A1  10/2019
CA  3097140 A1  10/2019
(Continued)

OTHER PUBLICATIONS

3GPP TS 36.413, V14.4.1, "3rd Generation Partnership Project; Technical Specification Group Radio Access Network; Evolved Universal Terrestrial Radio Access Network (E-UTRAN); S1 Application Protocol (S1AP) (Release 14)", 2018.
(Continued)

Primary Examiner — Willie J Daniel, Jr.
(74) Attorney, Agent, or Firm — Patent Beach PC

(57) ABSTRACT

Apparatus and methods for unified high-bandwidth, low-latency data services provided with enhanced user mobility. In one embodiment, a network architecture having service delivery over at least portions of extant infrastructure (e.g., a hybrid fiber coax infrastructure) is disclosed, which includes standards-compliant ultra-low latency and high data rate services (e.g., 5G NR services) via a common service provider. In one variant, an expanded frequency band (e.g., 1.6 GHz in total bandwidth) is used over the coaxial portions of the HFC infrastructure, which is allocated to two or more sub-bands. Wideband amplifier apparatus are used to support delivery of the sub-bands to extant HFC network nodes (e.g., hubs or distribution points) within the network. Premises devices are used to provide the 5G-based services to users at a given premises and there-
(Continued)

abouts. In another variant, local area (e.g., "pole mounted") radio devices are used to provide supplemental RF coverage, including during mobility scenarios.

20 Claims, 23 Drawing Sheets

(51) Int. Cl.
| | |
|---|---|
| *H04L 5/00* | (2006.01) |
| *H04L 12/28* | (2006.01) |
| *H04L 27/00* | (2006.01) |
| *H04L 27/26* | (2006.01) |
| *H04W 16/14* | (2009.01) |
| *H04W 72/0453* | (2023.01) |
| *H04W 36/08* | (2009.01) |
| *H04W 80/10* | (2009.01) |
| *H04J 3/16* | (2006.01) |
| *H04W 56/00* | (2009.01) |
| *H04L 41/5003* | (2022.01) |
| *H04L 47/70* | (2022.01) |
| *H04L 67/12* | (2022.01) |
| *H04W 48/18* | (2009.01) |
| *H04L 61/5007* | (2022.01) |
| *H04M 7/00* | (2006.01) |
| *H04W 84/04* | (2009.01) |

(52) U.S. Cl.
CPC ........ *H04L 5/0041* (2013.01); *H04L 12/2801* (2013.01); *H04L 27/0006* (2013.01); *H04L 27/2637* (2013.01); *H04L 41/5003* (2013.01); *H04L 47/821* (2013.01); *H04L 61/5007* (2022.05); *H04L 67/12* (2013.01); *H04W 16/14* (2013.01); *H04W 36/08* (2013.01); *H04W 48/18* (2013.01); *H04W 56/001* (2013.01); *H04W 72/0453* (2013.01); *H04W 80/10* (2013.01); *H04M 7/006* (2013.01); *H04Q 2213/13012* (2013.01); *H04W 84/042* (2013.01)

(56) References Cited

U.S. PATENT DOCUMENTS

| | | | |
|---|---|---|---|
| 6,757,837 | B1 | 6/2004 | Platt et al. |
| 7,581,012 | B2 | 8/2009 | Shiouchi et al. |
| 8,265,028 | B2 | 9/2012 | Davies et al. |
| 8,599,797 | B2 | 12/2013 | Pelkonen |
| 8,724,588 | B2 | 5/2014 | Li et al. |
| 8,750,710 | B1 | 6/2014 | Hirt et al. |
| 8,880,071 | B2 | 11/2014 | Taaghol et al. |
| 8,989,297 | B1 | 3/2015 | Lou et al. |
| 9,001,789 | B2 | 4/2015 | Hosobe |
| 9,596,593 | B2 | 3/2017 | Li et al. |
| 9,706,512 | B2 | 7/2017 | Suh |
| 9,948,349 | B2 * | 4/2018 | Malach ............... H04W 4/80 |
| 10,009,431 | B2 | 6/2018 | Holtmanns |
| 10,375,629 | B2 | 8/2019 | Zhang |
| 10,452,342 | B2 | 10/2019 | Triplett |
| 10,506,499 | B2 | 12/2019 | Keller et al. |
| 10,885,569 | B2 | 1/2021 | Ogaz et al. |
| 11,129,213 | B2 | 9/2021 | Vaidya |
| 2004/0139177 | A1 | 7/2004 | Yook |
| 2005/0063317 | A1 | 3/2005 | Risberg et al. |
| 2008/0101291 | A1 | 5/2008 | Jiang et al. |
| 2008/0279287 | A1 | 11/2008 | Asahina |
| 2009/0163140 | A1 | 6/2009 | Packham et al. |
| 2009/0176490 | A1 | 7/2009 | Kazmi et al. |
| 2010/0008235 | A1 | 1/2010 | Tinnakornsrisuphap et al. |
| 2010/0035610 | A1 | 2/2010 | Narang et al. |
| 2010/0178912 | A1 | 7/2010 | Gunnarsson et al. |
| 2011/0117917 | A1 | 5/2011 | Gresset et al. |
| 2011/0124335 | A1 | 5/2011 | Martin et al. |
| 2011/0207456 | A1 | 8/2011 | Radulescu et al. |
| 2012/0076009 | A1 | 3/2012 | Pasko |
| 2012/0224563 | A1 | 9/2012 | Zisimopoulos et al. |
| 2012/0246255 | A1 | 9/2012 | Walker et al. |
| 2012/0275315 | A1 | 11/2012 | Schlangen et al. |
| 2013/0010686 | A1 | 1/2013 | Shatzkamer et al. |
| 2013/0077554 | A1 | 3/2013 | Gauvreau et al. |
| 2013/0156115 | A1 | 6/2013 | Petrovic |
| 2013/0178225 | A1 | 7/2013 | Xing |
| 2013/0252616 | A1 | 9/2013 | Murakami |
| 2013/0267229 | A1 | 10/2013 | Gopalakrishnan |
| 2013/0279914 | A1 | 10/2013 | Brooks |
| 2013/0322504 | A1 | 12/2013 | Asati et al. |
| 2014/0148107 | A1 | 5/2014 | Maltsev et al. |
| 2014/0282802 | A1 | 9/2014 | Bowler et al. |
| 2014/0370895 | A1 | 12/2014 | Pandey et al. |
| 2015/0085853 | A1 | 3/2015 | Smith et al. |
| 2015/0156777 | A1 | 6/2015 | Negus et al. |
| 2015/0201088 | A1 | 7/2015 | Wu et al. |
| 2015/0229584 | A1 | 8/2015 | Okamoto et al. |
| 2015/0365178 | A1 | 12/2015 | Maattanen et al. |
| 2016/0013855 | A1 | 1/2016 | Campos et al. |
| 2016/0020835 | A1 | 1/2016 | Stadelmeier et al. |
| 2016/0073344 | A1 | 3/2016 | Vutukuri et al. |
| 2016/0094421 | A1 | 3/2016 | Bali et al. |
| 2016/0128072 | A1 | 5/2016 | Rajagopal et al. |
| 2016/0174043 | A1 | 6/2016 | Ko et al. |
| 2016/0174268 | A1 | 6/2016 | Hu et al. |
| 2016/0212632 | A1 | 7/2016 | Katamreddy et al. |
| 2016/0259923 | A1 | 9/2016 | Papa et al. |
| 2016/0373974 | A1 | 12/2016 | Gomes et al. |
| 2017/0019144 | A1 | 1/2017 | Malach |
| 2017/0201912 | A1 | 7/2017 | Zingler et al. |
| 2017/0208488 | A1 | 7/2017 | Hwang et al. |
| 2017/0245281 | A1 | 8/2017 | Zuckerman et al. |
| 2017/0265220 | A1 | 9/2017 | Andreoli-Fang et al. |
| 2018/0063813 | A1 | 3/2018 | Gupta et al. |
| 2018/0092142 | A1 | 3/2018 | Han et al. |
| 2018/0098245 | A1 | 4/2018 | Livanos et al. |
| 2018/0184337 | A1 | 6/2018 | Jin et al. |
| 2018/0213452 | A1 | 7/2018 | Kim et al. |
| 2018/0331935 | A1 | 11/2018 | Ross et al. |
| 2018/0338277 | A1 | 11/2018 | Byun et al. |
| 2018/0343685 | A1 | 11/2018 | Hart et al. |
| 2018/0351665 | A1 | 12/2018 | Fukuta et al. |
| 2018/0351809 | A1 | 12/2018 | Meredith et al. |
| 2018/0375887 | A1 | 12/2018 | Dezent et al. |
| 2019/0007870 | A1 | 1/2019 | Gupta et al. |
| 2019/0037630 | A1 | 1/2019 | Zhang et al. |
| 2019/0053193 | A1 | 2/2019 | Park et al. |
| 2019/0075023 | A1 | 3/2019 | Sirotkin |
| 2019/0082501 | A1 | 3/2019 | Vesely et al. |
| 2019/0109643 | A1 | 4/2019 | Campos et al. |
| 2019/0124572 | A1 | 4/2019 | Park et al. |
| 2019/0124696 | A1 | 4/2019 | Islam et al. |
| 2019/0208380 | A1 | 7/2019 | Shi et al. |
| 2019/0229974 | A1 | 7/2019 | Campos et al. |
| 2019/0245740 | A1 | 8/2019 | Kachhla |
| 2019/0253944 | A1 | 8/2019 | Kim |
| 2019/0261264 | A1 | 8/2019 | Lou et al. |
| 2019/0289470 | A1 | 9/2019 | Vaidya et al. |
| 2019/0319814 | A1 * | 10/2019 | Das .................... H04L 12/2801 |
| 2019/0319858 | A1 | 10/2019 | Das et al. |
| 2019/0320250 | A1 | 10/2019 | Hoole et al. |
| 2019/0320494 | A1 * | 10/2019 | Jayawardene .... H04W 72/0453 |
| 2019/0349848 | A1 | 11/2019 | Bali |
| 2019/0357037 | A1 | 11/2019 | Velev et al. |
| 2019/0357199 | A1 | 11/2019 | Ali et al. |
| 2019/0363866 | A1 | 11/2019 | Gaal |
| 2019/0379455 | A1 | 12/2019 | Wang et al. |
| 2020/0037211 | A1 | 1/2020 | Hinc |
| 2020/0053545 | A1 | 2/2020 | Wong et al. |
| 2020/0091608 | A1 | 3/2020 | Alpman et al. |
| 2020/0120724 | A1 | 4/2020 | Vaidya et al. |
| 2020/0126551 | A1 | 4/2020 | Xiong et al. |
| 2020/0154388 | A1 | 5/2020 | Koshimizu et al. |
| 2020/0186378 | A1 | 6/2020 | Six et al. |
| 2020/0214065 | A1 | 7/2020 | Tomala et al. |

(56) References Cited

U.S. PATENT DOCUMENTS

| | | |
|---|---|---|
| 2020/0280836 A1 | 9/2020 | Velev et al. |
| 2021/0029759 A1 | 1/2021 | Tang |
| 2021/0168476 A1 | 6/2021 | Das et al. |
| 2021/0289275 A1 | 9/2021 | Das |
| 2021/0314762 A1 | 10/2021 | Wong et al. |
| 2022/0007440 A1 | 1/2022 | Vaidya et al. |
| 2022/0046343 A1 | 2/2022 | Hoole et al. |
| 2022/0183093 A1 | 6/2022 | Sevindik et al. |

FOREIGN PATENT DOCUMENTS

| | | |
|---|---|---|
| CA | 3097144 A1 | 10/2019 |
| CN | 105071860 A | 11/2015 |
| CN | 111989900 A | 11/2020 |
| EP | 0812119 A2 | 12/1997 |
| EP | 3782305 A1 | 2/2021 |
| EP | 3782341 A1 | 2/2021 |
| EP | 3782435 A1 | 2/2021 |
| GB | 2548796 A | 10/2017 |
| JP | 2007281617 A | 10/2007 |
| JP | 2010136020 A | 6/2010 |
| JP | 2011254495 A | 12/2011 |
| JP | 2016511998 A | 4/2016 |
| JP | 2017118483 A | 6/2017 |
| JP | 2018023050 A | 2/2018 |
| JP | 2018510589 A | 4/2018 |
| JP | 2021521712 A | 8/2021 |
| KR | 20160097917 A | 8/2016 |
| WO | WO-2004045125 A2 | 5/2004 |
| WO | WO-2019204165 A1 | 10/2019 |
| WO | WO-2019204166 A1 | 10/2019 |
| WO | WO-2019204336 A1 | 10/2019 |
| WO | WO-2020033334 A1 | 2/2020 |
| WO | WO-2020077346 A1 | 4/2020 |
| WO | WO-2020081471 A1 | 4/2020 |

OTHER PUBLICATIONS

Interworking Wi-Fi and Mobile Networks, The Choice of Mobility Solutions, White Paper, 2013, 13 pages.

3GPP, "3rd Generation Partnership Project; Technical Specification Group Radio Access Network," TS 38.473 (v15.0.0), Dec. 2017, NG-RAN, F1 application protocol (F1AP), Release 15.

Campos., et al., U.S. Appl. No. 62/620,615, filed Jan. 23, 2018 related to publication US20190229974A1. (Year: 2018).

Maamoun K. M. et al., "A Survey and a Novel Scheme for RoF-PON as FTTx Wireless Services," 2009 6th InternationalSymposium on High Capacity Optical Networks and EnablingTechnologies(HONET), IEEE, 2009, pp. 246-253.

Broadband Forum: "SD-420 R2 5G Fixed Mobile Convergence Study", Aug. 14, 2018 (Aug. 14, 2018), XP051533179, [retrieved on Aug. 14, 2018]Retrieved from the Internet: URL:http://www.3gpp.org/ftp/tsg_sa/TSG_SA/TSGS_81/Docs/SP-180636.zip.

\* cited by examiner

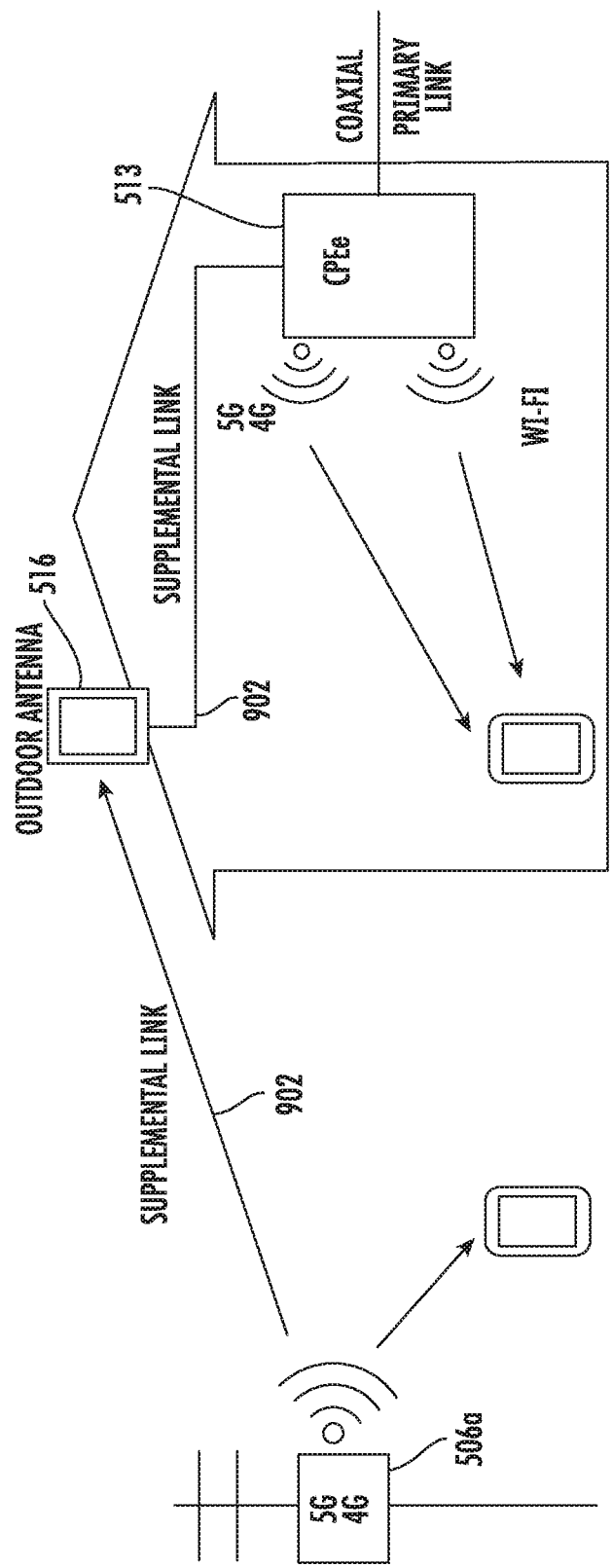

APPARATUS AND METHODS FOR INTEGRATED HIGH-CAPACITY DATA AND WIRELESS NETWORK SERVICES

PRIORITY AND RELATED APPLICATIONS

This application claims the benefit of priority to U.S. Provisional Patent Application No. 62/658,465 filed Apr. 16, 2018 and entitled "APPARATUS AND METHODS FOR INTEGRATED HIGH-CAPACITY DATA AND WIRELESS NETWORK SERVICES", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data networks and wireless devices, and specifically in one exemplary aspect to an architecture which integrates or unifies provision of high-speed data services in a variety of different locations and use cases.

2. Description of Related Technology

Data communication services are now ubiquitous throughout user premises (e.g., home, office, and even vehicles). Such data communication services may be provided via a managed or unmanaged network. For instance, a typical home has services provided by one or more network service providers via a managed network such as a cable or satellite network. These services may include content delivery (e.g., linear television, on-demand content, personal or cloud DVR, "start over", etc.), as well as so-called "over the top" third party content. Similarly, Internet and telephony access is also typically provided, and may be bundled with the aforementioned content delivery functions into subscription packages, which are increasingly becoming more user- or premises-specific in their construction and content. Such services are also increasingly attempting to adopt the paradigm of "anywhere", anytime," so that users (subscribers) can access the desired services (e.g., watch a movie) via a number of different receiving and rendering platforms, such as in different rooms of their house, on their mobile device while traveling, etc.

Managed Cable Networks

Network operators deliver data services (e.g., broadband) and video products to customers using a variety of different devices, thereby enabling their users or subscribers to access data/content in a number of different contexts, both fixed (e.g., at their residence) and mobile (such as while traveling or away from home). FIGS. 1 and 2 are a functional block diagrams illustrating a typical prior art managed (e.g., cable) content delivery network architecture used to provide such data services to its users and sub scribers.

Data/content delivery may be specific to the network operator, such as where video content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via e.g., a hybrid fiber coax (HFC) cable/fiber network, such as to the subscriber's set-top box or DOCSIS cable modem. Such ingested content is transcoded to the necessary format as required (e.g., MPEG-2 or MPEG-4/AVC), framed and placed in the appropriate media container format ("packaged"), and transmitted via e.g., statistical multiplex into a multi-program transport stream (MPTS) on 6 MHz radio frequency (RF) channels for receipt by the subscribers RF tuner, demultiplexed and decoded, and rendered on the user's rendering device (e.g., digital TV) according to the prescribed coding format.

Within the cable plant, VOD and so-called switched digital video (SDV) may also be used to provide content, and utilize a single-program transport stream (SPTS) delivery modality. In U. S. cable systems for example, downstream RF channels used for transmission of television programs are 6 MHz wide, and occupy a 6 MHz spectral slot between 54 MHz and 860 MHz. Deployments of VOD services have to share this spectrum with already established analog and digital cable television services such as those described above. Within a given cable plant, all homes that are electrically connected to the same cable feed running through a neighborhood will receive the same downstream signal. For the purpose of managing e.g., VOD services, these homes are grouped into logical groups typically called Service Groups. Homes belonging to the same Service Group receive their VOD service on the same set of RF channels.

VOD service is typically offered over a given number (e.g., 4) of RF channels from the available spectrum in cable. Thus, a VOD Service Group consists of homes receiving VOD signals over the same 4 RF channels.

In most cable networks, programs are transmitted using MPEG (e.g., MPEG-2) audio/video compression. Since cable signals are transmitted using Quadrature Amplitude Modulation (QAM) scheme, available payload bitrate for typical modulation rates (QAM-256) used on HFC systems is roughly 38 Mbps. For example, in many VOD deployments, a typical rate of 3.75 Mbps is used to send one video program at resolution and quality equivalent to NTSC broadcast signals. In digital television terminology, this is called Standard Definition (SD) television resolution. Therefore, use of MPEG-2 and QAM modulation enables carriage of 10 SD sessions on one RF channel (10×3.75=37.5 Mbps<38 Mbps). Since a typical Service Group consists of 4 RF channels, 40 simultaneous SD VOD sessions can be accommodated within a Service Group.

Entertainment-quality transmission of HD (High Definition) signals requires about four times as much bandwidth as SD. For an exemplary MPEG-2 Main Profile—High Level (MP@HL) video compression, each HD program requires around 15 Mbps bitrate.

OTT—

Alternatively, so-called "over-the-top" or OTT delivery may be used for providing services within a network, wherein content from a third party source who may be unaffiliated with the network operator provides content directly to the requesting user or subscriber via the network operator's infrastructure (including the cable architecture described supra), e.g., via an IP-based transport; i.e., the content is packetized and routed for delivery to the requesting user based on the user's network or IP address, such as via the aforementioned high-speed DOCSIS cable modem, according to the well-known Internet Protocol network-layer protocol.

IP unicasts (point to point) or multicasts (point to multiple points) have traditionally been used as the mechanism by which the OTT content is distributed over the network, via the user accessing a prescribed URL and logging in with their credentials to gain access to the content. The IP content is then streamed via the unicast/multicast to the requesting user(s), and received and decoded by a media player application program ("app") on the user's PC, laptop, or other IP-enabled end-user device.

Cloud-Based Functions—

In order to gain operational and economic efficiencies, technology stacks within content delivery networks such as HFC-based cable networks have over time generally migrated towards the "cloud" or network side of the network (e.g., into regionalized data centers), and away from the end user (client) consuming devices. Hence, the client device's content presentation capabilities are dictated increasingly by these cloud-based functions (including network-side caching architecture), along with the on-board storage and processing power of the client device and its associated software stack.

For example, cloud-based EPGs (electronic program guides) are increasingly configured to provide a streamlined user experience, reduced device processing and storage footprint, and a consistent and simple mechanism for software upgrades across multiple different types of HW/SW platforms (e.g., different OEM devices). For instance, HTML 5-based cloud apps are increasingly replacing native apps (i.e., those incorporated into the design of the device at time of manufacture) for implementing such functions. Implementations such as the cloud-based "Spectrum Guide" offered by the Assignee hereof is more labor intensive for the client, due largely to the need for client processes or functions to interface with network-side entities or processes.

In the foregoing example of cloud-delivered EPGs, all objects (from content poster art to the elements of the day/time grid, and most visual video content) is stitched and delivered as a single stream to the client device (e.g., DSTB), as opposed to being indigenously generated by the DSTB. Specifically, the program guide elements (e.g., graphics) are stitched together as a transport stream, while video content that is utilized within a window or other display element of this program guide on the user device comes from a different source, and any advertisements come from yet a third location, akin to the operation of a web browser. This approach can present several challenges in performance, specifically with respect to latency associated with video transitions from one program channel to another, from one type of content to another (such as VOD to DVR), as well as video content to advertising content (e.g., linear addressable content, described above) transitions. Even in the most basic channel tuning functions, such transitions can take several seconds, due to inter alia, the need to repopulate/generate EPG display elements based on the cloud data and service.

As a brief aside, subscribers or users characteristically make programming selection decisions in less than 1 second (based on anecdotal evidence of the Assignee hereof). Conversely, a typical user has difficulty perceiving delays less than several milliseconds. Hence, the aforementioned multi-second latency or delay is highly detrimental to user experience, including by failing to keep users engaged with particular content, and with the service provider brand in general.

Other sources of delay in content switching transactions may exist as well. For instance, where the (primary) video content is delivered encoded in one format (e.g., H.264) and the switched-to content (e.g., addressable advertisement) is encoded in a different format (e.g., MPEG-2), delays in processing the MPEG-2 content may arise from, inter alia, processing to support the rendering of MPEG-2 content (e.g., identification and utilization of an MPEG-2 compatible decoder or player on the client device). Conversely, the motion compensation and other features associated with H.264 and other advanced codecs (discussed in greater detail below) can require significant processing overhead, thereby adding to the computational burden on the DSTB (or other client device). Likewise, open-GOP (group of pictures) processing versus closed-GOP processing can consume additional time and resources.

Wireless

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE). |
| | 1900 MHz PCS, Band 2 (GSM/GPRS/EDGE). |
| | 850 MHz Cellular, Band 5 (UMTS/HSPA+ up to 21 Mbit/s). |
| | 1900 MHz PCS, Band 2 (UMTS/HSPA+ up to 21 Mbit/s). |
| 4G | 700 MHz Lower B/C, Band 12/17 (LTE). |
| | 850 MHz Cellular, Band 5 (LTE). |
| | 1700/2100 MHz AWS, Band 4 (LTE). |
| | 1900 MHz PCS, Band 2 (LTE). |
| | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs (e.g., Wi-Fi) and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a node or "hotspot," a physical location at which the user may obtain access by connecting to modems, routers, APs, etc. that are within wireless range.

One such technology that enables a user to engage in wireless communication (e.g., via services provided through the cable network operator) is Wi-Fi® (IEEE Std. 802.11), which has become a ubiquitously accepted standard for wireless networking in consumer electronics. Wi-Fi allows client devices to gain convenient high-speed access to networks (e.g., wireless local area networks (WLANs)) via one or more access points.

Commercially, Wi-Fi is able to provide services to a group of users within a venue or premises such as within a trusted home or business environment, or outside, e.g., cafes, hotels, business centers, restaurants, and other public areas. A typical Wi-Fi network setup may include the user's client device in wireless communication with an AP (and/or a modem connected to the AP) that are in communication with the backend, where the client device must be within a certain range that allows the client device to detect the signal from the AP and conduct communication with the AP.

Another wireless technology in widespread use is Long-Term Evolution standard (also colloquially referred to as "LTE," "4G," "LTE Advanced," among others). An LTE network is powered by an Evolved Packet Core ("EPC"), an Internet Protocol (IP)-based network architecture and eNodeB—Evolved NodeB or E-UTRAN node which part of the Radio Access Network (RAN), capable of providing high-speed wireless data communication services to many wireless-enabled devices of users with a wide coverage area.

Currently, most consumer devices include multi-RAT capability; e.g.; the capability to access multiple different RATs, whether simultaneously, or in a "fail over" manner (such as via a wireless connection manager process running on the device). For example, a smartphone may be enabled for LTE data access, but when unavailable, utilize one or more Wi-Fi technologies (e.g., 802.11g/n/ac) for data communications.

The capabilities of different RATs (such as LTE and Wi-Fi) can be very different, including regarding establishment of wireless service to a given client device. For example, there is a disparity between the signal strength threshold for initializing a connection via Wi-Fi vs. LTE (including those technologies configured to operate in unlicensed bands such as LTE-U and LTE-LAA). As a brief aside, LTE-U enables data communication via LTE in an unlicensed spectrum (e.g., 5 GHz) to provide additional radio spectrum for data transmission (e.g., to compensate for overflow traffic). LTE-LAA uses carrier aggregation to combine LTE in unlicensed spectrum (e.g., 5 GHz) with the licensed band. Typical levels of signal strength required for LTE-U or LTE-LAA service are approximately −80 to −84 dBm. In comparison, Wi-Fi can be detected by a client device based on a signal strength of approximately −72 to −80 dBm, i.e., a higher (i.e., less sensitive) detection threshold.

Increasing numbers of users (whether users of wireless interfaces of the aforementioned standards, or others) invariably lead to "crowding" of the spectrum, including interference. Interference may also exist from non-user sources such as solar radiation, electrical equipment, military uses, etc. In effect, a given amount of spectrum has physical limitations on the amount of bandwidth it can provide, and as more users are added in parallel, each user potentially experiences more interference and degradation of performance.

Moreover, technologies such as Wi-Fi have limited range (due in part to the unlicensed spectral power mask imposed in those bands), and may suffer from spatial propagation variations (especially inside structures such as buildings) and deployment density issues. Wi-Fi has become so ubiquitous that, especially in high-density scenarios such as hospitality units (e.g., hotels), enterprises, crowded venues, and the like, the contention issues may be unmanageable, even with a plethora of Wi-Fi APs installed to compensate. Yet further, there is generally no coordination between such APs, each in effect contending for bandwidth on its backhaul with others.

Additionally, lack of integration with other services provided by e.g., a managed network operator, typically exists with unlicensed technology such as Wi-Fi. Wi-Fi typically acts as a "data pipe" opaquely carried by the network operator/service provider.

5G New Radio (NR) and NG-RAN (Next Generation Radio Area Network)—

NG-RAN or "NextGen RAN (Radio Area Network)" is part of the 3GPP "5G" next generation radio system. 3GPP is currently specifying Release 15 NG-RAN, its components, and interactions among the involved nodes including so-called "gNBs" (next generation Node B's or eNBs). NG-RAN will provide very high-bandwidth, very low-latency (e.g., on the order of 1 ms or less "round trip") wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

In some aspects, exemplary Release 15 NG-RAN leverages technology and functions of extant LTE/LTE-A technologies (colloquially referred to as 4G or 4.5G), as bases for further functional development and capabilities. For instance, in an LTE-based network, upon startup, an eNB (base station) establishes S1-AP connections towards the MME (mobility management entity) whose commands the eNB is expected to execute. An eNB can be responsible for multiple cells (in other words, multiple Tracking Area Codes corresponding to E-UTRAN Cell Global Identifiers). The procedure used by the eNB to establish the aforementioned S1-AP connection, together with the activation of cells that the eNB supports, is referred to as the S1 SETUP procedure; see inter alia, 3GPP TS 36.413 V14.4.1 entitled "3rd Generation Partnership Project; Technical Specification Group Radio Access Network; Evolved Universal Terrestrial Radio Access Network (E-UTRAN); S1 Application Protocol (S1AP) (Release 14)" dated January 2018, which is incorporated herein by reference in its entirety.

As a brief aside, and referring to FIG. 3, the CU 304 (also known as gNB-CU) is a logical node within the NR architecture 300 that communicates with the NG Core 303, and includes gNB functions such as transfer of user data, session management, mobility control, RAN sharing, and positioning; however, other functions are allocated exclusively to the DU(s) 306 (also known as gNB-DUs) per various "split" options described subsequently herein in greater detail. The CU 304 communicates user data and controls the operation of the DU(s) 306, via corresponding front-haul (Fs) user plane and control plane interfaces 308, 310.

Accordingly, to implement the Fs interfaces 308, 310, the (standardized) F1 interface is employed. It provides a mechanism for interconnecting a gNB-CU 304 and a gNB-DU 306 of a gNB 302 within an NG-RAN, or for interconnecting a gNB-CU and a gNB-DU of an en-gNB within an E-UTRAN. The F1 Application Protocol (F1AP) supports the functions of F1 interface by signaling procedures defined in 3GPP TS 38.473. F1AP consists of so-called "elementary procedures" (EPs). An EP is a unit of interaction between gNB-CU and gNB-DU. These EPs are defined separately and are intended to be used to build up complete messaging sequences in a flexible manner. Generally, unless otherwise stated by the restrictions, the EPs may be invoked independently of each other as standalone procedures, which can be active in parallel.

Within such an architecture 300, a gNB-DU 306 (or ngeNB-DU) is under the control of a single gNB-CU 304. When a gNB-DU is initiated (including power-up), it executes the F1 SETUP procedure (which is generally modeled after the above-referenced S1 SETUP procedures of LTE) to inform the controlling gNB-CU of, inter alia, any number of parameters such as e.g., the number of cells (together with the identity of each particular cell) in the F1 SETUP REQUEST message.

Better Solutions Needed

Even with the great advances in wireless data rate, robustness and coverage afforded by extant 4/4.5G (e.g. LTE/LTE- A) and WLAN (and other unlicensed) systems, and corresponding IoT solutions outlined above, significant disabilities still exist.

One such problem relates to the scenario where a broadband user migrates from an indoor use case to an outdoor use case. For instance, a user utilizing their premises Wi-Fi AP experiences a very limited range—perhaps 100 feet or so depending on premises construction and other factors—before they experience degradation and ultimately loss of signal. Moreover, there is no session continuity between shorter range technologies such as Wi-Fi and longer range broadband cellular systems such as LTE (i.e., a user must terminate their Wi-Fi session and continue using a new LTE (3GPP) session). Such "unlicensed to licensed" (and vice versa) spectral use also presents unique challenges, in that unlicensed systems are often not configured to integrate with MNO systems (e.g., WLAN APs are not configured to comply with 3GPP eUTRAN or other such standards as far as interoperability).

Moreover, the foregoing solutions are generally not integrated or logically unified, and may also require subscription to and use of multiple service provider technologies and infrastructure. For example, unlicensed WLAN APs within a user premises may be backhauled by a cable or fiber or satellite MSO, while cellular service is provided by a wholly separate MNO using licensed cellular infrastructure.

In cases where MNO or other radio access node or base stations are backhauled by another provider (e.g., a wireless network built around HFC/DOCSIS as backhaul between the radio and wireless core network elements), several disadvantages are encountered, including (i) separate CAPEX (capital expenditure) and OPEX (operating expenditure) "silos" for maintaining the two different networks; i.e., wired and wireless; and (ii) lower data throughput efficiency and higher latency due to the additional overhead of encapsulating wireless data packets through e.g., the DOCSIS (backhaul) protocols. In the context of the aforementioned ultra-low latency requirements of 5G (i.e., 1 ms or less round-trip between endpoint nodes), such infrastructure-induced latency can result in failing to meet these requirements, making this architecture potentially unsuitable for 5G applications.

Moreover, to achieve certain capacity targets (e.g., 10 Gbps) over such infrastructure, increased use of optical fiber is needed in certain parts of the infrastructure. Under current HFC network design, services are provided to users via a coaxial cable "drop" to their premises, and groups of such premises are served by common tap-off points or nodes within the larger architecture (see discussion of cable systems supra). Individual premises "tap off" the cabling or other infrastructure from each node and, depending on their geographic placement and other considerations, may require utilization of a number of different amplification units in order to maintain sufficient signal strength out to the most distant (topology-wise) premises in the system. For instance, a common description of how many amplifier stages are used between a source node and premises is "N+i", where i=the number of amplifier stages between the source node and the premises. For instance, N=0 refers to the situation where no amplifiers are used, and N+3 refers to use of three (3) amplifiers. In some extant cable/HFC systems in operation, values of i may be as high as seven (7); i.e., N+7, such as for service to rural areas.

As can be expected, use of such amplifier stages introduces some limitations on the data rates or bandwidth (both downstream; i.e., toward the client premises, and upstream, i.e., from the client premises) achievable by such systems. In effect, such systems are limited in maximum bandwidth/data rate, due in part to the design of the amplifiers; for example, they are typically designed to provide services primarily in the downstream direction (with much lower upstream bandwidth via so-called "OOB" or out-of band RF channels providing highly limited upstream communication. Cable modem or DOCSIS-compliant systems utilize DOCSIS QAMs (RF channels) for enhanced upstream bandwidth capability such as for Internet services, but even such technologies are significantly limited in capability, and moreover have limited flexibility in the allocation of downstream versus upstream bandwidth, especially dynamically.

Accordingly, as alluded to above, replacement of such amplifier stages (and supporting coaxial cabling) with higher bandwidth, low-loss mediums such as optical fiber is necessary to achieve very high target data rates (sometimes referred to as going "fiber deep"), including all the way back to an N+0 configuration throughout the entire network to achieve the highest data rates. However, replacement of literally tens of thousands of amplifiers and thousands of miles of cabling with optical fiber or the like is prohibitively expensive, and can take years.

Accordingly, improved apparatus and methods are needed to, inter alia, enable optimized delivery of ultra-high data rate services (both wired and wireless) and which leverage extant network infrastructure. Ideally, such improved apparatus and methods would also support seamless geographic and cross-platform mobility for users while providing such services, and support incipient applications and technologies such as IoT.

SUMMARY

The present disclosure addresses the foregoing needs by providing, inter alia, methods and apparatus for providing optimized delivery of ultra-high data rate services (both wired and wireless) and which leverage extant network infrastructure.

In a first aspect of the disclosure, a method of operating a radio frequency (RF) network so that extant infrastructure is used to deliver integrated wireless data services is disclosed. In one embodiment, the method includes: transmitting OFDM (orthogonal frequency division multiplexing) waveforms over at least a portion of the extant infrastructure using at least a frequency band wider in frequency than a normal operating band of the extant infrastructure, the frequency band being lower in frequency than a user frequency band; receiving the transmitted OFDM waveforms via at least one premises device; upconverting the OFDM waveforms to the user frequency band to form upconverted waveforms; and transmitting the upconverted waveforms to at least one user device.

In one variant, the extant infrastructure comprises a hybrid fiber coax (HFC) infrastructure, and the integrated wireless data services comprise data delivery at rates in excess of 1 Gbps.

In one implementation, the frequency band wider in frequency than a normal operating band of the extant infrastructure comprises a frequency band of at least 1.6 GHz in total bandwidth, and the further including allocating the frequency band of at least 1.6 GHz in total bandwidth to two or more sub-bands, such as via using wideband amplifier apparatus.

In another implementation, the allocating further comprises delivery of the two or more sub-bands to one or more extant HFC network hubs.

In another variant, the upconverting the OFDM waveforms to the user frequency band comprises upconverting to a frequency band including 5 GHz but excluding frequencies below 3 GHz.

In yet another variant, the transmitting the upconverted waveforms to at least one user device comprises transmitting using at least a 3GPP Fifth Generation (5G) New Radio (NR) compliant air interface in an unlicensed radio frequency band.

In a further variant, the transmitting OFDM (orthogonal frequency division multiplexing) waveforms over at least a portion of the extant infrastructure using at least a frequency band wider in frequency than a normal operating band of the extant infrastructure comprises transmitting the OFDM waveforms over at least coaxial cable and via a plurality of amplifier stages associated with the coaxial cable.

In another aspect, a network architecture configured to support wireless user devices is disclosed. In one embodiment, the architecture includes: a distribution node, the distribution node configured to transmit radio frequency (RF) waveforms onto a wireline or optical medium of a network, the RF waveforms being orthogonal frequency division multiplex (OFDM) modulated; and a first plurality of user nodes.

In one variant, each of the first plurality of user nodes is in data communication with the wireline or optical medium and includes a receiver apparatus configured to: receive the transmitted OFDM modulated waveforms; upconvert the OFDM modulated waveforms to at least one user frequency band to form upconverted waveforms; and transmit the upconverted waveforms to at least one wireless user device.

In one implementation, the network architecture includes a radio node in data communication with the distribution node and at least one of the first plurality of user nodes, the radio node configured to provide at least supplemental data communication to the at least one user node. The radio node is in data communication with the distribution node via at least an optical fiber medium, and the radio node is in data communication with the at least one user node via a wireless interface.

In another implementation, the radio node is in data communication with the distribution node via at least an optical fiber medium, and the radio node is in data communication with the at least one user node via a wireless interface.

In a further implementation, the network architecture includes a second distribution node, the second distribution node configured to transmit radio frequency (RF) waveforms onto a second wireline or optical medium of the network, the RF waveforms being orthogonal frequency division multiplex (OFDM) modulated, the second wireline or optical medium of the network serving a second plurality of user nodes different than the first plurality of user nodes. The architecture may also include a radio node in data communication with at least the distribution node and (i) at least one of the first plurality of user nodes, and (ii) at least one of the second plurality of user nodes, the radio node configured to provide at least supplemental data communication to both the at least one of the first plurality of user nodes, and the at least one of the second plurality of user nodes.

In one particular implementation, the radio node is in data communication with the distribution node via at least an optical fiber medium, and the radio node is in data communication with both the at least one of the first plurality of user nodes, and the at least one of the second plurality of user nodes, via a wireless interface utilizing an unlicensed portion of the RF spectrum.

In another implementation, the network architecture includes at least one wireless local area node, the at least one wireless local area node in data communication with at least one of the first plurality of user nodes, the at least one wireless local area node configured to wirelessly communicate with the at least one wireless user device via unlicensed radio frequency spectrum not within the user frequency band.

The network architecture may also include at least one wireless local area node controller in data communication with the distribution node, the at least one wireless local area node controller configured to cooperate with the distribution node to effect handover of one or more wireless sessions between the at least wireless local area node and the at least one of the first plurality of user nodes.

The at least one wireless local area node may operate for example within a first unlicensed frequency band, and the at least one of the first plurality of user nodes operates within a second unlicensed frequency band. For instance, the at least one wireless local area node may operate according to an IEEE-Std. 802.11 (Wi-Fi) protocol, and the at least one of the first plurality of user nodes may operate according a 3GPP 5G NR (Fifth Generation, New Radio) protocol.

In another aspect of the disclosure, a controller apparatus for use within a hybrid fiber/coaxial cable distribution network is described. In one embodiment, the controller apparatus includes: a radio frequency (RF) communications management module; a first data interface in data communication with the RF communications management module for data communication with a network core process; a second data interface in data communication with the RF communications management module for data communication with a first RF distribution node of the hybrid fiber/coaxial cable distribution network; and a third data interface in data communication with the RF communications management module for data communication with a second RF distribution node of the hybrid fiber/coaxial cable distribution network.

In one variant, the radio frequency (RF) communications management module includes computerized logic to enable at least the transmission of digital data from at least one of the first RF distribution node and the second RF distribution node with an RF band outside of that normally used by the at least one first RF distribution node and the second RF distribution node.

In one implementation, the radio frequency (RF) communications management module includes a 3GPP Fifth Generation New Radio (5G NR) gNB (gNodeB) Controller Unit (CU), the first data interface for data communication with a network core process includes a 3GPP Fifth Generation New Radio (5G NR) $X_n$ interface with a 5GC (Fifth Generation Core), and the second data interface includes a 3GPP Fifth Generation New Radio (5G NR) F1 interface operative over at least a wireline data bearer medium, the first RF distribution node including a 3GPP Fifth Generation New Radio (5G NR) gNB (gNodeB) Distributed Unit (DU); and the third data interface includes an Fifth Generation New Radio (5G NR) F1 interface operative over at least a dense wave division multiplexed (DWDM) optical data bearer, the second RF distribution node including a 3GPP Fifth Generation New Radio (5G NR) gNB (gNodeB) Distributed Unit (DU).

In one aspect, methods and apparatus for seamless mobility in a network with heterogeneous media using common control nodes is disclosed. In one embodiment, the method includes use of common network elements and a split CU-DU base-station architecture for providing a seamless mobility experience between indoor and outdoor spaces which are connected using common waveforms and protocols through heterogeneous media, e.g., HFC and wireless. In one variant, the provided services include broadband data, mobility data, IoT and video streaming.

In another aspect, methods and apparatus for data throughput performance-triggered mobility between 3GPP and Wi-Fi is provided. In one embodiment, a centralized Wi-Fi controller is utilized; via data communication between the Wi-Fi controller and a 3GPP mobility controller, both indoor and outdoor spaces are provided coordinated 3GPP and Wi-Fi service coverage.

In another aspect, an optical to coaxial cable transducer that can transmit and receive 3GPP 4G LTE and 5G NR waveforms to multiple CPE through a single coaxial cable is disclosed.

In another aspect, methods and apparatus for supplementing broadband capacity available through a primary link is disclosed. In one embodiment, the primary link includes a coaxial cable, and a redundant supplemental link is provided. In one variant, one or more RF interfaces on a CPE are included for connecting the CPE to e.g., a 2-port external antenna which is installed outdoors at the served premises. This external antenna can be used to receive supplemental signals from outdoor radios installed in the vicinity of the served premises. The outdoor radios may provide, inter alia, coverage for outdoor mobility, and/or in a "fixed-wireless" configuration to supplement the capacity from the primary coaxial link and/or to add redundancy.

In another aspect, computerized network apparatus for use in a data network is disclosed. In one variant, the network includes an HFC network with NG-RAN capability, and the apparatus includes at least one enhanced DU (DUe).

In another variant, the network apparatus includes at least one enhanced CU (CUe), which can control a number of DU/DUe.

In yet another aspect, a system is disclosed. In one embodiment, the system includes (i) a controller entity, (ii) one or more distributed entities in data communication therewith via an HFC bearer. In one variant, a further complementary or supplemental link is provided via e.g., wireless access nodes positioned external to a serviced premises and which a premises CPE can access via a dedicated antenna apparatus. The access nodes are backhauled to a managed (HFC) network via extant coaxial cable or fiber, or supplemental cable or fiber.

In still a further aspect of the disclosure, a method for providing device mobility is described. In one embodiment, the method includes providing indoor wireless coverage via a wireless-enabled CPE backhauled by an HFC network, and providing outdoor wireless coverage via one or more external (e.g., pole mounted) access nodes.

In another aspect of the disclosure, a method for providing device mobility is described. In one embodiment, the method includes first providing indoor/outdoor premises wireless coverage via a wireless-enabled CPE backhauled by an HFC network, and subsequently providing outdoor wireless coverage via one or more external (e.g., pole mounted) access nodes via a handover while maintaining data session continuity.

In a further aspect of the disclosure, a method for providing high speed data services to a device is described. In one embodiment, the method includes providing indoor wireless coverage via a wireless-enabled CPE backhauled by an HFC network, and supplementing that capability via one or more external (e.g., pole mounted) access nodes that are communicative with the CPE via an external antenna apparatus. In one variant, the external access nodes are backhauled by the same HFC network.

In another aspect, a computerized access node implementing one or more of the foregoing aspects is disclosed and described. In one embodiment, the access node includes a wireless interface capable of data communication with a user device (e.g., UE). In one variant, the device is pole-mounted (e.g., on a telephone or utility pole), and further is configured to interface with a premises CPE via e.g., an antenna apparatus mounted on an exterior of the premises.

In another aspect, a computerized premises device implementing one or more of the foregoing aspects is disclosed and described. In one embodiment, the device includes a CPE having 5G NR capability, and is backhauled via an extant coaxial cable drop. In one variant, the device also includes a plurality of IoT wireless interfaces, and provision for connection with an externally mounted antenna for use in communicating with one or more of the external access nodes.

In another aspect, a computerized device implementing one or more of the foregoing aspects is disclosed and described. In one embodiment, the device includes a personal or laptop computer. In another embodiment, the device includes a mobile device (e.g., tablet or smartphone). In another embodiment, the device includes a computerized "smart" television or rendering device.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

In another aspect, a computer readable storage apparatus implementing one or more of the foregoing aspects is disclosed and described. In one embodiment, the computer readable apparatus includes a program memory, or an EEPROM. In another embodiment, the apparatus includes a solid state drive (SSD) or other mass storage device. In another embodiment, the apparatus includes a USB or other "flash drive" or other such portable removable storage device. In yet another embodiment, the apparatus includes a "cloud" (network) based storage device which is remote from yet accessible via a computerized user or client electronic device. In yet another embodiment, the apparatus includes a "fog" (network) based storage device which is distributed across multiple nodes of varying proximity and accessible via a computerized user or client electronic device.

In a further aspect, an optical-to-coaxial cable transducer that can transmit and receive 3GPP 4G LTE and 5G NR waveforms to multiple CPE through a single coaxial cable interface is disclosed.

In a further aspect, a method of introducing expanded data network services within a network infrastructure are disclosed. In one embodiment, the network includes an HFC cable network, and the method includes (i) utilizing extant bearer media (e.g., coaxial cable to premises) as a primary backhaul for high speed data services, and (ii) subsequently using extant bearer media (e.g., coaxial cable or optical fiber to extant wireless nodes such as cellular base stations) to provide supplemental bandwidth/mobility services to the premises users. In another variant, the method further includes (iii) subsequently installing new optical fiber or other media to support backhaul of new (currently non-existent "pole mounted" or similar opportunistic access nodes which support further user mobility for the users/subscribers of the network operator.

These and other aspects shall become apparent when considered in light of the disclosure provided herein.

BRIEF DESCRIPTION OF THE DRAWINGS

FIG. 9a is a block diagram illustrating an exemplary embodiment of a supplemental wireless link architecture supporting indoor enhanced bandwidth capability, according to the present disclosure.

Figure 1:
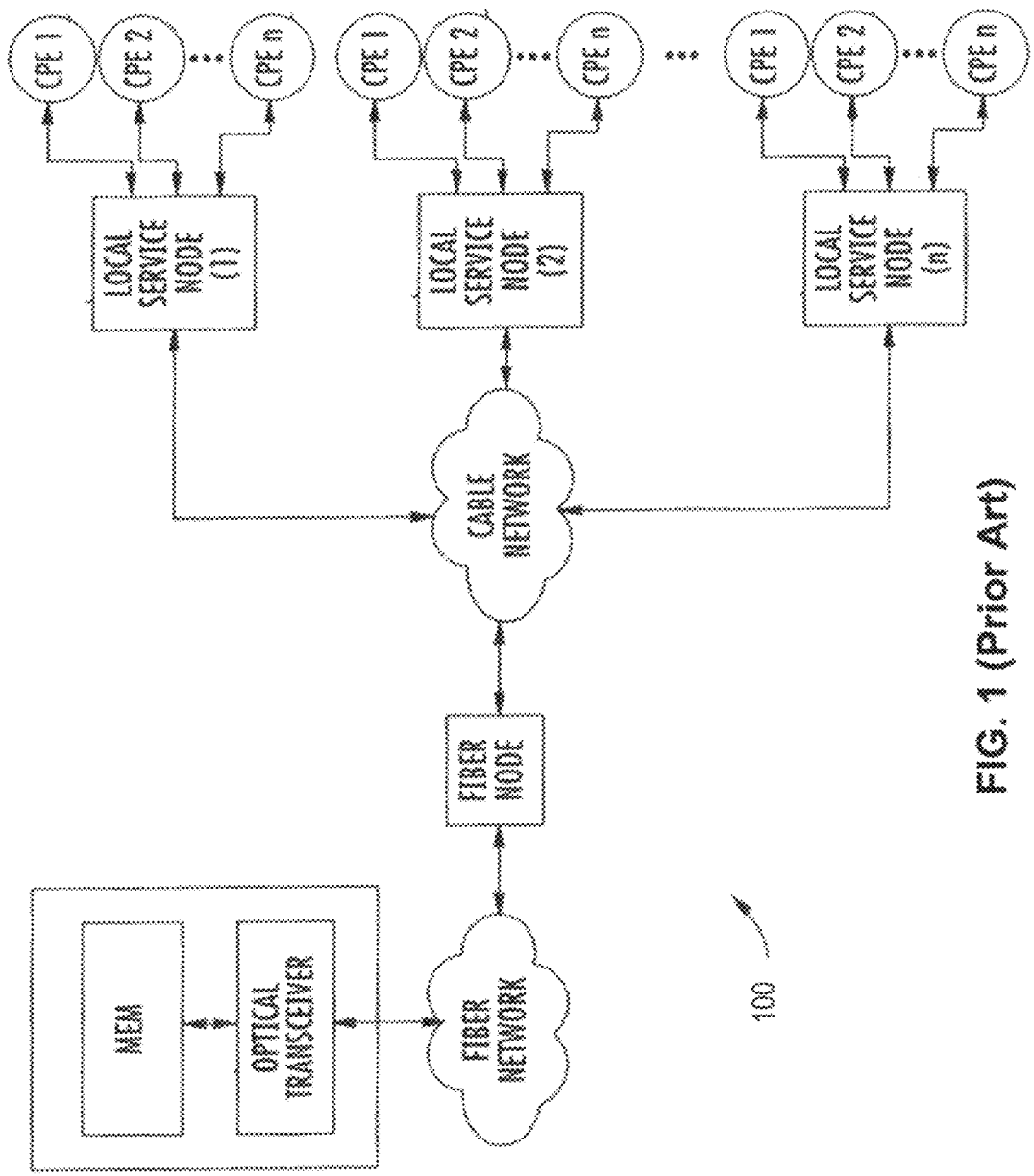
FIGS. 1 and 2 are a functional block diagrams illustrating a typical prior art managed (e.g., cable) content delivery network architecture.

All figures © Copyright 2017-2018 Charter Communications Operating, LLC. All rights reserved.

DETAILED DESCRIPTION

Reference is now made to the drawings wherein like numerals refer to like parts throughout.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "central unit" or "CU" refers without limitation to a centralized logical node within a wireless network infrastructure. For example, a CU might be embodied as a 5G/NR gNB Central Unit (gNB-CU), which is a logical node hosting RRC, SDAP and PDCP protocols of the gNB or RRC and PDCP protocols of the en-gNB that controls the operation of one or more gNB-DUs, and which terminates the F1 interface connected with one or more DUs (e.g., gNB-DUs) defined below.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "distributed unit" or "DU" refers without limitation to a distributed logical node within a wireless network infrastructure. For example, a DU might be embodied as a 5G/NR gNB Distributed Unit (gNB-DU), which is a logical node hosting RLC, MAC and PHY layers of the gNB or en-gNB, and its operation is partly controlled by gNB-CU (referenced above). One gNB-DU supports one or multiple cells, yet a given cell is supported by only one gNB-DU. The gNB-DU terminates the F1 interface connected with the gNB-CU.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices, or provides other services such as high-speed data delivery and backhaul.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "IoT device" refers without limitation to electronic devices having one or more primary functions and being configured to provide and/or receive data via one or more communication protocols. Examples of IoT devices include security or monitoring systems, appliances, consumer electronics, vehicles, infrastructure (e.g., traffic signaling systems), and medical devices, as well as receivers, hubs, proxy devices, or gateways used in association therewith.

As used herein, the term "IoT network" refers without limitation to any logical, physical, or topological connection or aggregation of two or more IoT devices (or one IoT device and one or more non-IoT devices). Examples of IoT networks include networks of one or more IoT devices arranged in a peer-to-peer (P2P), star, ring, tree, mesh, master-slave, and coordinator-device topology.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, VoLTE (Voice over LTE), and other wireless data standards.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications technologies or networking protocols (e.g., SONET, DOCSIS, IEEE Std. 802.3, ATM, X.25, Frame Relay, 3GPP, 3GPP2, LTE/LTE-A/LTE-U/LTE-LAA, 5GNR, WAP, SIP, UDP, FTP, RTP/RTCP, H.323, etc.).

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac/ax, 802.11-2012/2013 or 802.11-2016, as well as Wi-Fi Direct (including inter alia, the "Wi-Fi Peer-to-Peer (P2P) Specification", incorporated herein by reference in its entirety).

Overview

In one exemplary aspect, the present disclosure provides improved architectures, methods and apparatus for providing enhanced ultra-high data rate services which, inter alia, leverage existing managed network (e.g., cable network) infrastructure. The disclosed architectures enable a highly uniform user-experience regardless of the environment (e.g., indoor/outdoor/mobility), in which content is consumed and eliminates the need to distinguish between fixed-broadband and mobile-broadband, or the foregoing and IoT.

In one embodiment, a Hybrid Fiber Coax (HFC) plant infrastructure and extant 3GPP LTE and 5G NR protocols are used as bases for provision of standards-compliant ultra-low latency and high data rate services (e.g., 5G NR services) via a common service provider. In one variant, an expanded frequency band (approximately 1.6 GHz in total bandwidth) is used over the coaxial portions of the HFC infrastructure, which is allocated to two or more sub-bands. Wideband amplifier apparatus are used to support delivery of the sub-bands to extant HFC network nodes (e.g., hubs or distribution points) within the network, and ultimately to premises devices. An OFDM and TDD-based access and modulation scheme is used to allow for maximal efficiency and flexibility in allocating bandwidth to UL and DL transmissions over the HFC infrastructure.

5G-enabled premises devices (e.g., CPE) are used within the foregoing architecture to provide the services to users at a given premises and thereabouts, using extant 3GPP protocols. In another variant, local area (e.g., "pole mounted") radio access nodes are used in concert with the 5G-enabled CPE to provide supplemental RF coverage, including during mobility scenarios, as well as supplemental capacity to the CPE for indoor use cases (i.e., when the CPE requires additional bandwidth over what the HFC coaxial cable drop to the premises alone can provide), thereby enabling data rates on the order of 10 Gbps and above.

Advantageously, in exemplary embodiments, the foregoing enhanced high data rate, high mobility, low latency services are provided without (i) the need for any module or customized application software or protocols of the user device (e.g., mobile UE), and (ii) the need to expend CAPEX/OPEX relating to laying new fiber and/or maintaining two (e.g., MSO and MNO) network infrastructures in parallel.

Moreover, latency within the disclosed infrastructure is reduced by, inter alia, obviating encapsulation and other network/transport protocols normally necessitated through use of e.g., DOCSIS bearers and equipment (i.e., DOCSIS modems and CMTS apparatus within the MSO core.

Edge-heavy solutions (e.g., Fog models) are also supported via the use of the 5G protocols as well as high bandwidth and enhanced connectivity out at the edge of the MSO infrastructure.

Using 3GPP protocols through HFC also enables broadband service benefits stemming from the rich feature set, vendor diversity and operational reliability that 3GPP has already developed for the over 2.6 billion global subscribers of 3GPP 4G LTE.

The improved architecture also advantageously facilitates so-called "network slicing," including providing differentiated services (and QoS/QoE) for various target applications and use cases.

Detailed Description of Exemplary Embodiments

Exemplary embodiments of the apparatus and methods of the present disclosure are now described in detail. While these exemplary embodiments are described in the context of the previously mentioned wireless access nodes (e.g., gNBs) associated with or supported at least in part by a managed network of a service provider (e.g., MSO), other types of radio access technologies ("RATs"), other types of networks and architectures that are configured to deliver digital data (e.g., text, images, games, software applications, video and/or audio) may be used consistent with the present disclosure. Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed service area, venue, or other type of premises), the present disclosure may be readily adapted to other types of environments including, e.g., commercial/retail, or enterprise domain (e.g., businesses), or even governmental uses. Yet other applications are possible.

Other features and advantages of the present disclosure will immediately be recognized by persons of ordinary skill in the art with reference to the attached drawings and detailed description of exemplary embodiments as given below.

Service Provider Network Architecture—

Figure 5:
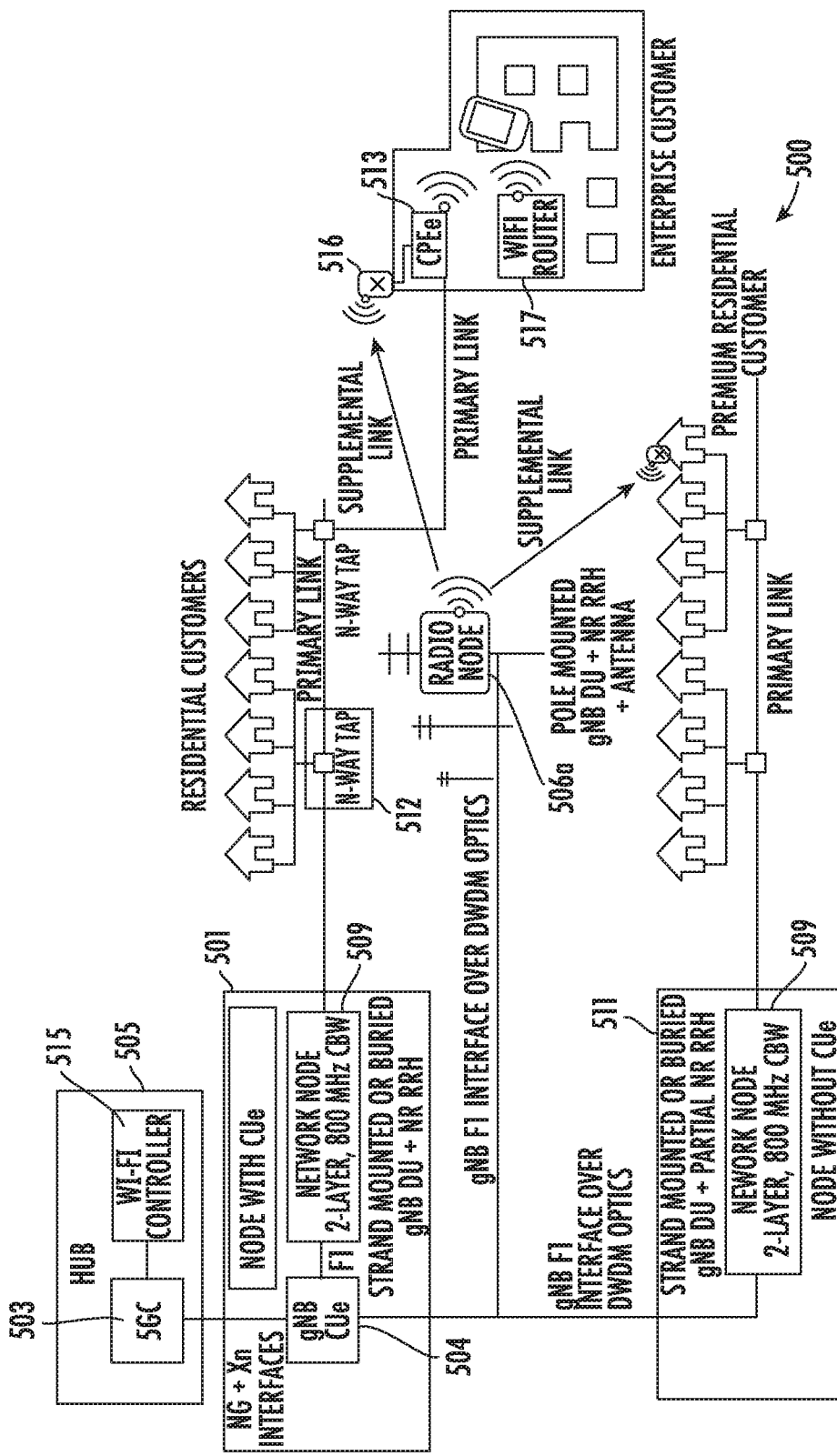
FIG. 5 is a functional block diagram of an exemplary MSO network architecture comprising various features described herein.

Referring now to FIG. 5, one embodiment of an enhanced service provider network architecture 500 is shown and described in detail.

As illustrated, the architecture 500 includes one or more hubs 505 within the MSO network (e.g., whether near edge portions of the network, or further towards the core), including a 5G NR core (5GC) 503. The hub 505 includes a WLAN controller process 515, and services one or more "enhanced" nodes 501, which each include a gNB CUe 504 and an network radio node 509, described in greater detail below. The nodes 501 utilize HFC infrastructure, including N-way taps 512 to deliver RF waveforms to the various served premises (including the enhanced CPE or CPEe) 513.

Also serviced by the node 501 are one or more non-CUe enabled nodes 511 including 4G/5G enabled network radio nodes 509, which service additional premises as shown.

In the illustrated embodiment, the nodes 501, 511 are backhauled by optical fiber, although this is merely illustrative, as other types of backhauls including e.g., high-bandwidth wireless may be used consistent with the present disclosure.

Similarly, one or more pole-mounted radio nodes 506a are backhauled to the MSO network via optical fiber (or other medium); these nodes 506a provide, inter alia, supplemental capacity/coverage for both indoor and outdoor (and mobility) scenarios as described in greater detail below.

A Wi-Fi router device 517 is also present in the served premises to provide WLAN coverage, in conjunction with the controller 515 at the hub 505. The centralized Wi-Fi controller 515 is also utilized in the exemplary architecture 500 for tight-interworking and better mobility between the 3GPP and Wi-Fi access technologies where the Wi-Fi router is either integrated with the consumer premises equipment (e.g., enhanced CPE or CPEe) or connected to it. Then, mobility between the 3GPP and Wi-Fi channels for any user can be triggered for the best data throughput, such as based on (i) estimation of the RF quality of the Wi-Fi channel toward the user, and/or (ii) the degree of congestion of the Wi-Fi router, and not just the Wi-Fi received signal strength indicators (RSSI) measured at the mobile device, the latter which may not be representative of the service quality that can be obtained by the user.

In the exemplary configuration, the controller (e.g., Wi-Fi Controller 515) is configured to choose the best (optimal) wireless connection available to it based on performance (as opposed to coverage/coverage area alone). Typically today, a preferred method of access is predetermined based on its received signal strength and/or as a preferred means (e.g. Wi-Fi could be defined as the preferred method of access to offload the mobile wireless network). However, this method suffers from the drawback of blind 'stickiness' to a technology, without considering the end user experience. Given that in exemplary embodiments of the architecture described herein, both Wi-Fi and licensed/unlicensed 3GPP access technologies are both controlled by the network operator (e.g. MSO), there is no need to prefer an access method, such as to purely to offload a user's traffic. The decision to offload or steer a user to a given access technology, can be based upon other criteria, such as e.g., a select set of Key Performance Indicators (KPIs) such as the user perceived latency, throughput, packet loss, jitter and bit/packet/frame error rates as measured in real-time at any given layer (e.g., L1, L2 or L3) by the network. For instance, in one implementation, once a target KPI threshold is triggered, the switching of the user can be triggered by either the AMF function (for 3GPP) or Wi-Fi Controller. This switching may then trigger a session establishment at the alternate access medium to transfer the user to that technology. This helps optimize QoE for connected users, since the controller will always be attempting to holistically optimize the connection versus merely making decisions based on coverage or signal strength alone.

This architecture also obviates the problematic transition between premises Wi-Fi and cellular, thereby enabling content consumption while the user is mobile, with no reduction in QoE or interruptions due to e.g., new session establishment in the cellular network. This is accomplished by, inter alia, communication between the Wi-Fi controller 515 and the CUe 504, such that the CUe can remain cognizant of both Wi-Fi and 3GPP channel status, performance and availability. Advantageously, in exemplary embodiments, the foregoing enhanced mobility is provided without the need for any module or customized application software or protocols of the user device (e.g., mobile UE), since all communication sessions (whether between the CPEe and the UE, or the supplemental radio access node and the UE) are both (i) controlled by a common system, and (ii) utilize extant 3GPP (e.g., 4G/4.5G/5G) protocols and architectural elements. In one variant a GPRS Tunneling Protocol (GTP) is utilized for maintenance of session continuity between the heterogeneous RAN technologies (e.g., 3GPP and IEEE Std. 802.11). In another variant, a PMIP (Proxy Mobile IP) based approach is utilized for session maintenance/handover. In yet a further variant, techniques described in 3GPP TS 23.234 v13.1.0, "3GPP system to Wireless Local Area Network (WLAN) interworking; System description (Release 13)," incorporated herein by reference in its entirety, (aka "I-WLAN") based approach is utilized for these purposes. As will be appreciated by those of ordinary skill given the present disclosure, combinations of the foregoing mechanisms may be utilized as well, depending on the particular application (including the two heterogeneous technologies that are party to the session maintenance/handoff).

The MSO network architecture 500 of FIG. 5 is particularly useful for the delivery of packetized content (e.g., encoded digital content carried within a packet or frame structure or protocol) consistent with the various aspects of the present disclosure. In addition to on-demand and broadcast content (e.g., live video programming), the system of FIG. 5 may deliver Internet data and OTT (over-the-top) services to the end users (including those of the DUe's 506) via the Internet protocol (IP) and TCP (i.e., over the 5G radio bearer), although other protocols and transport mechanisms of the type well known in the digital communication art may be substituted.

The architecture 500 of FIG. 5 further provides a consistent and seamless user experience with IPTV over both wireline and wireless interfaces. Additionally, in the IP paradigm, dynamic switching between unicast delivery and multicast/broadcast is used based on e.g., local demand. For instance, where a single user (device) is requesting content, an IP unicast can be utilized. For multiple devices (i.e., with multiple different IP addresses, such as e.g., different premises), multicast can be utilized. This approach provides for efficient and responsive switching of delivery and obviates other more equipment/CAPEX-intensive approaches.

Moreover, the architecture can be used for both broadband data delivery as well as "content" (e.g., movie channels) simultaneously, and obviates much of the prior separate infrastructure for "in band" and DOCSIS (and OOB) transport. Specifically, with DOCSIS (even FDX DOCSIS), bandwidth is often allocated for video QAMs, and a "split" is hard-coded for downstream and upstream data traffic. This hard split is typically implemented across all network elements—even amplifiers. In contrast, under the exemplary configuration of the architecture disclosed herein, effectively all traffic traversing the architecture is IP-based, and hence in many cases there is no need to allocate QAMs and frequency splits for different program or data streams. This "all-IP" approach enables flexible use of the available bandwidth on the transmission medium for all applications dynamically, based on for instance the demand of each such application at any given period or point in time.

In certain embodiments, the service provider network 500 also advantageously permits the aggregation and/or analysis of subscriber- or account-specific data (including inter alia, correlation of particular CUe or DUe or E-UTRAN eNB/femtocell devices associated with such subscriber or accounts) as part of the provision of services to users under the exemplary delivery models described herein. As but one example, device-specific IDs (e.g., gNB ID, Global gNB Identifier, NCGI, MAC address or the like) can be cross-correlated to MSO subscriber data maintained at e.g., the network head end(s) 507 so as to permit or at least facilitate, among other things, (i) user/device authentication to the MSO network; (ii) correlation of aspects of the area, premises or venue where service is provided to particular subscriber capabilities, demographics, or equipment locations, such as for delivery of location-specific or targeted content or advertising or 5G "slicing" configuration or delivery; and (iii) determination of subscription level, and hence subscriber privileges and access to certain services as applicable.

Moreover, device profiles for particular devices (e.g., 3GPP 5g NR and WLAN-enabled UE, or the CPEe 513 and any associated antenna 516, etc.) can be maintained by the MSO, such that the MSO (or its automated proxy processes) can model the device for wireless or other capabilities. For instance, one (non-supplemented) CPEe 513 may be modeled as having bandwidth capability of X Gbps, while another premises' supplemented CPEe may be modeled as having bandwidth capability of X+Y Gbps, and hence the latter may be eligible for services or "slices" that are not available to the former.

As a brief aside, the 5G technology defines a number of network functions (NFs), which include the following:

1. Access and Mobility Management function (AMF)—Provides for termination of NAS signaling, NAS integrity protection and ciphering, registration and connection and mobility management, access authentication and authorization, and security context management. The AMF has functions analogous to part of the MME functionality of the prior Evolved Packet Core (EPC).

2. Application Function (AF)—Manages application influence on traffic routing, accessing NEF, interaction with policy framework for policy control. The NR AF is comparable to the AF in EPC.

3. Authentication Server Function (AUSF)—Provides authentication server functionality. The AUSF is similar to portions of the HSS from EPC.

4. Network Exposure function (NEF)—Manages exposure of capabilities and events, secure provision of information from external applications to 3GPP network, translation of internal/external information. The NEF is a wholly new entity as compared to EPC.

5. Network Slice Selection Function (NSSF)—Provides for selection of the Network Slice instances to serve the UE, determining the allowed NSSAI, determining the AMF set to be used to serve the UE. The NSSF is a wholly new entity as compared to EPC.

6. NF Repository function (NRF)—Supports the service discovery function, maintains NF profile and available NF instances The NRF is a wholly new entity as compared to EPC.

7. Policy Control Function (PCF)—Provides a unified policy framework, providing policy rules to CP functions, and access subscription information for policy decisions in UDR. The PCF has part of the PCRF functionality from EPC.

8. Session Management function (SMF)—Provides for session management (session establishment, modification, release), IP address allocation & management for UEs, DHCP functions, termination of NAS signaling related to session management, DL data notification, traffic steering configuration for UPF for proper traffic routing. The SMF includes portions of the MME and PGW functionality from EPC.

9. Unified Data Management (UDM)—Supports generation of Authentication and Key Agreement (AKA) credentials, user identification handling, access authorization, subscription management. This comprises a portion of HSS functionality from EPC.

10. User plane function (UPF)—The UPF provides packet routing & forwarding, packet inspection, QoS handling, and also acts as an external PDU session point of interconnect to Data Network (DN). The UPF may also act as an anchor point for intra-RAT and inter-RAT mobility. The UPF includes some of the prior SGW and PGW functionality from EPC.

Within the 5G NR architecture, the control plane (CP) and user plane (UP) functionality is divided within the core network or NGC (Next Generation Core). For instance, the 5G UPF discussed above supports UP data processing, while other nodes support CP functions. This divided approach advantageously allows for, inter alia, independent scaling of CP and UP functions. Additionally, network slices can be tailored to support different services, such as for instance those described herein with respect to session handover between e.g., WLAN and 3GPP NR, and supplemental links to the CPEe.

In addition to the NFs described above, a number of different identifiers are used in the NG-RAN architecture, including those of UE's and for other network entities, and may be assigned to various entities described herein. Specifically:

the AMF Identifier (AMF ID) is used to identify an AMF (Access and Mobility Management Function);
the NR Cell Global Identifier (NCGI), is used to identify NR cells globally, and is constructed from the PLMN identity to which the cell belongs, and the NR Cell Identity (NCI) of the cell;
the gNB Identifier (gNB ID) is used to identify gNBs within a PLMN, and is contained within the NCI of its cells;
the Global gNB ID, which is used to identify gNBs globally, and is constructed from the PLMN identity to which the gNB belongs, and the gNB ID;
the Tracking Area identity (TAI), which is used to identify tracking areas, and is constructed from the PLMN identity to which the tracking area belongs, and the TAC (Tracking Area Code) of the Tracking Area; and
the Single Network Slice Selection Assistance information (S-NSSAI), which is used to identify a network slice.

Hence, depending on what data is useful to the MSO or its customers, various portions of the foregoing can be associated and stored to particular gNB "clients" or their components being backhauled by the MSO network.

Distributed gNB Architectures

In the context of FIG. 5, the DUe's described herein may assume any number of forms and functions relative to the enhanced CPE (CPEe) 513 and the radio node 506a (e.g., pole mounted external device). Recognizing that generally speaking, "DU" and "CU" refer to 3GPP standardized features and functions, these features and functions can, so long as supported in the architecture 500 of FIG. 5, be implemented in any myriad number of ways and/or locations. Moreover, enhancements and/or extensions to these components (herein referred to as CUe and DUe) and their functions provided by the present disclosure may likewise be distributed at various nodes and locations throughout the architecture 500, the illustrated locations and dispositions being merely exemplary.

Figure 5A:
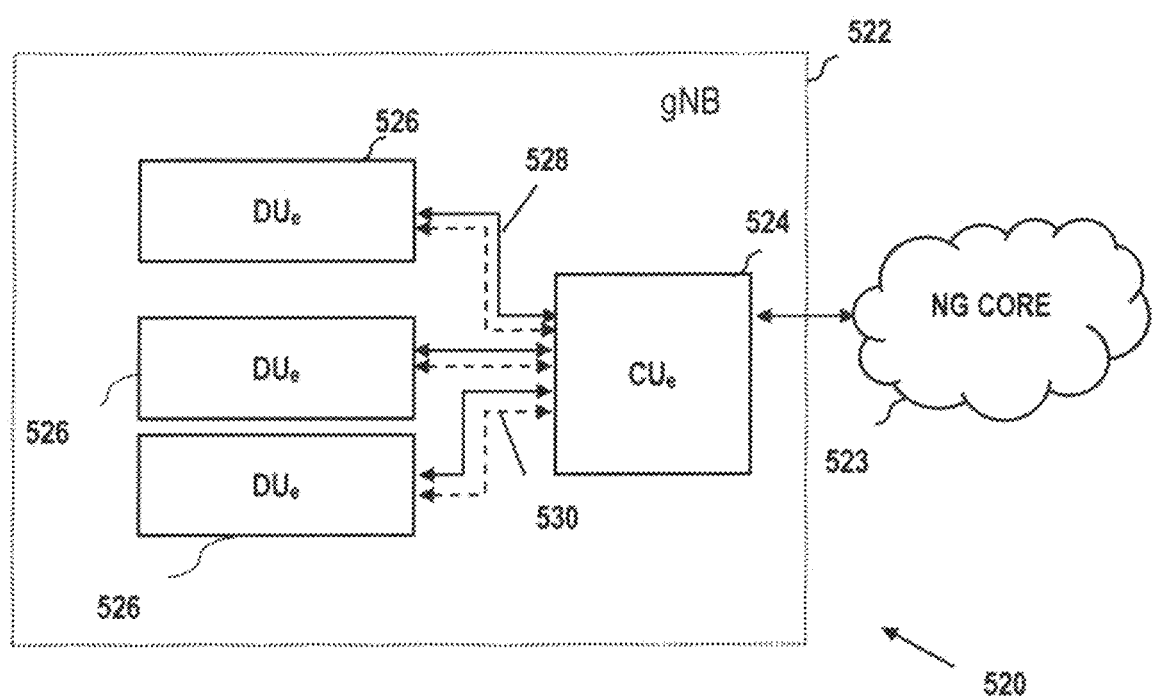
FIG. 5a is a functional block diagram of one exemplary embodiment of a gNB architecture including CUe and multiple DUes, according to the present disclosure.
Figure 5B:
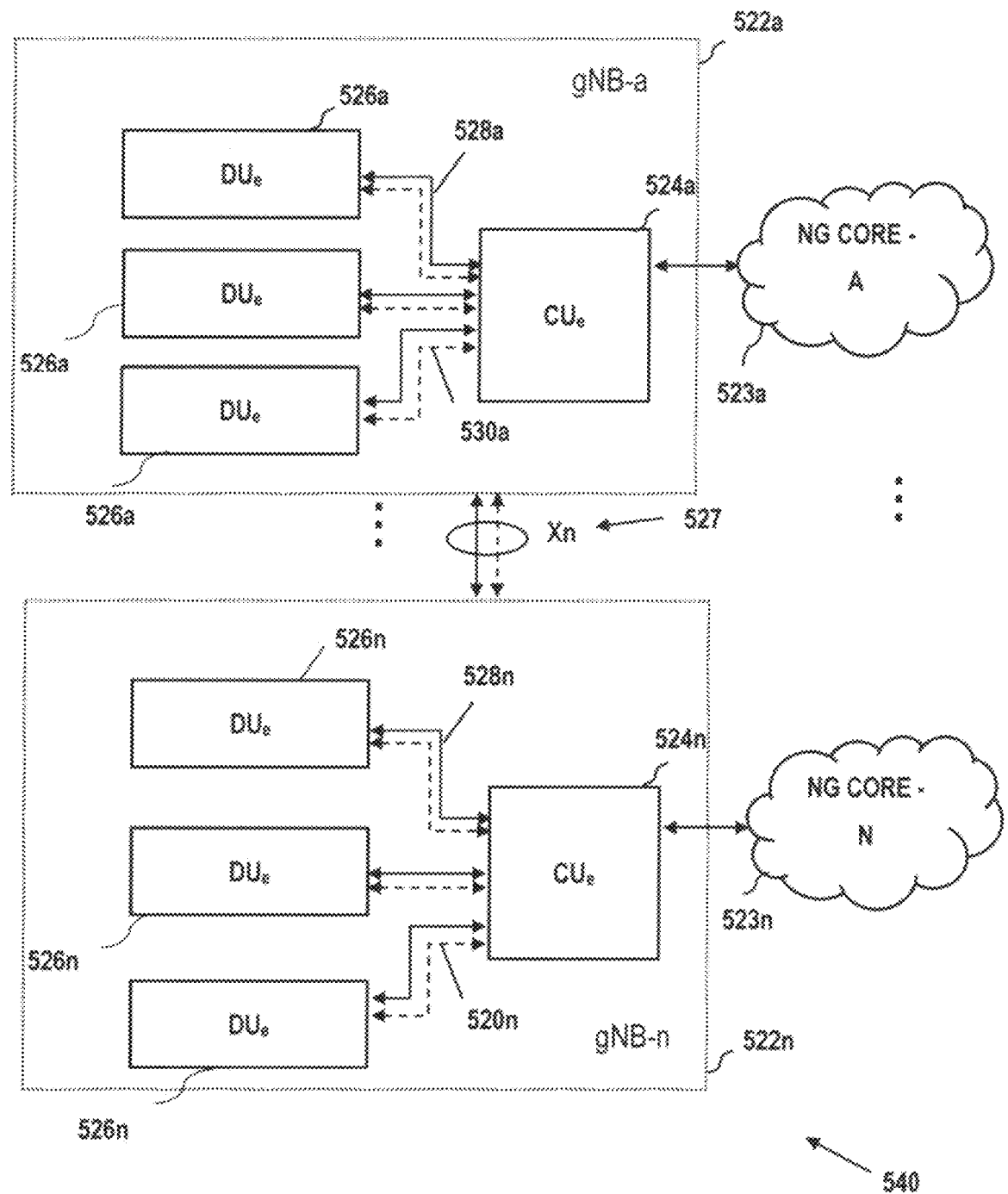
FIG. 5b is a functional block diagram of another exemplary embodiment of a gNB architecture including multiple CUes and multiple corresponding DUes, according to the present disclosure.
Figure 5C:
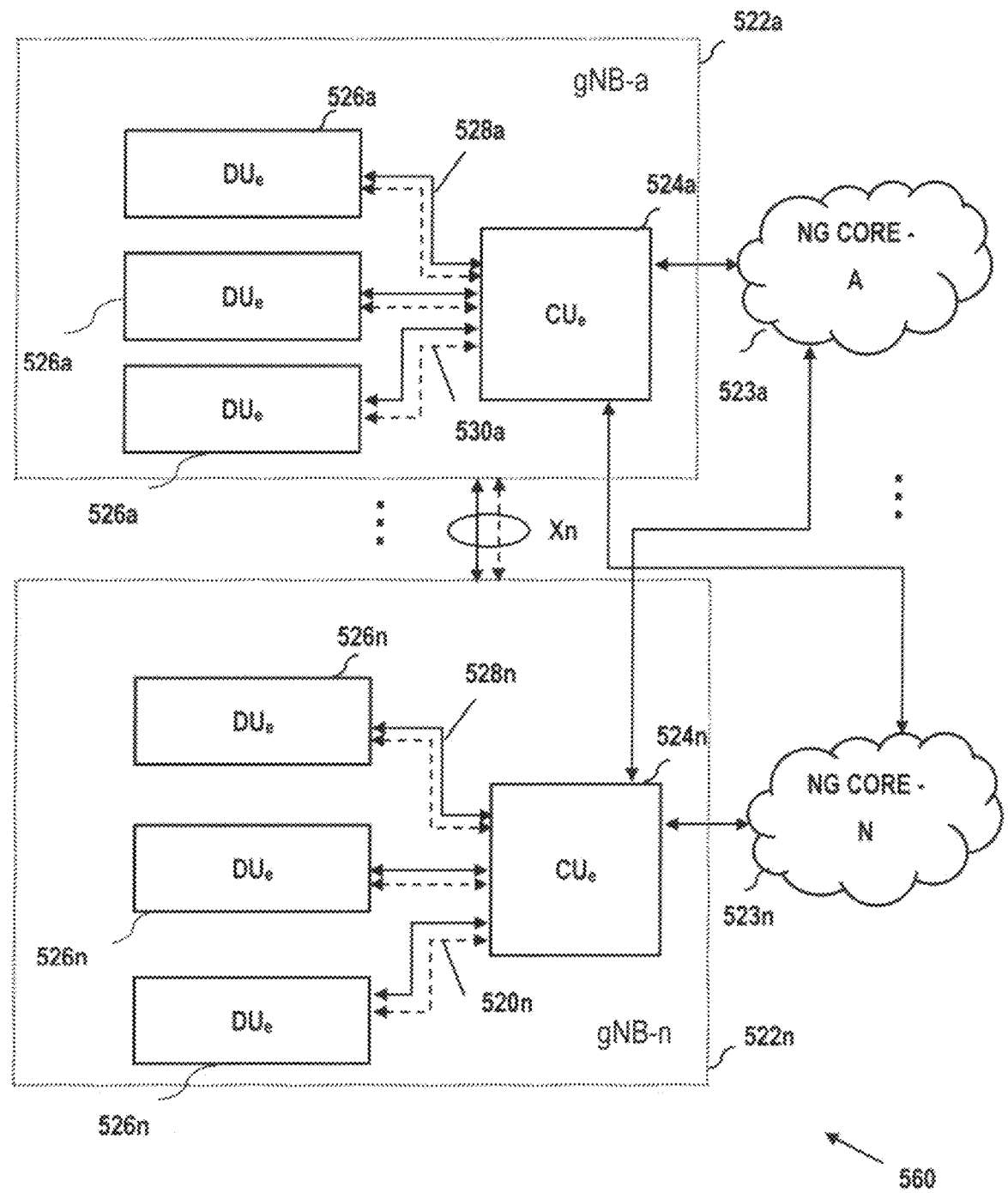
FIG. 5c is a functional block diagram of yet another exemplary embodiment of a gNB architecture including multiple CUes logically cross-connected to multiple different cores, according to the present disclosure.

Accordingly, referring now to FIGS. 5a-5c, various embodiments of the distributed (CUe/DUe) gNB architecture according to the present disclosure are described. As shown in FIG. 5a, a first architecture 520 includes a gNB 522 having an enhanced CU (CUe) 524 and a plurality of enhanced DUs (DUe) 526. As described in greater detail subsequently herein, these enhanced entities are enabled to permit inter-process signaling and high data rate, low latency services, whether autonomously or under control of another logical entity (such as the NG Core 523 with which the gNB communicates, or components thereof), as well as unified mobility and IoT services.

The individual DUe's 526 in FIG. 5a communicate data and messaging with the CUe 524 via interposed physical communication interfaces 528 and logical interfaces 410. As previously described, such interfaces may include a user plane and control plane, and be embodied in prescribed protocols such as F1AP. Operation of each DUe and CUe are described in greater detail subsequently herein; however, it will be noted that in this embodiment, one CUe 524 is associated with one or more DUe's 526, yet a given DUe is only associated with a single CUe. Likewise, the single CUe 524 is communicative with a single NG Core 523, such as that operated by an MSO. Each NG Core 523 may have multiple gNBs 522 associated therewith (e.g., of the type 504 shown in FIG. 5).

In the architecture 540 of FIG. 5b, two or more gNBs 522a-n are communicative with one another via e.g., an Xn interface 527, and accordingly can conduct at least CUe to CUe data transfer and communication. Separate NG Cores 523a-n are used for control and user plane (and other) functions of the network.

In the architecture 560 of FIG. 5c, two or more gNBs 522a-n are communicative with one another via e.g., the Xn interface 527, and accordingly can conduct at least CUe to CUe data transfer and communication. Moreover, the separate NG Cores 523a-n are logically "cross-connected" to the gNBs 522 of one or more other NG Cores, such that one core can utilize/control the infrastructure of another, and vice versa. This may be in "daisy chain" fashion (i.e., one gNB is communicative one other NG Core other than its own, and that NG Core is communicate with yet one additional gNB 522 other than its own, and so forth), or the gNBs 522 and NG Cores 523 may form a "mesh" topology where multiple Cores 523 are in communication with multiple gNBs or multiple different entities (e.g., service providers). Yet other topologies will be recognized by those of ordinary skill given the present disclosure. This cross-connection approach advantageously allows for, inter alia, sharing of infrastructure between two MSOs, or between MNO and MSO, which is especially useful in e.g., dense deployment environments which may not be able to support multiple sets of RAN infrastructure, such as for different service providers.

It will also be appreciated that while described primarily with respect to a unitary gNB-CUe entity or device 504, 524 as shown in FIGS. 5-5c, the present disclosure is in no way limited to such architectures. For example, the techniques described herein may be implemented as part of a distributed or dis-aggregated or distributed CUe entity (e.g., one wherein the user plane and control plane functions of the CUe are dis-aggregated or distributed across two or more entities such as a CUe-C (control) and CUe-U (user)), and/or other functional divisions are employed.

It is also noted that heterogeneous architectures of eNBs or femtocells (i.e., E-UTRAN LTE/LTE-A Node B's or base stations) and gNBs may be utilized consistent with the architectures of FIGS. 5-5c. For instance, a given DUe may (in addition to supporting node operations as discussed in greater detail with respect to FIGS. 7-7a below), act (i) solely as a DUe (i.e., 5G NR PHY node) and operate outside of an E-UTRAN macrocell, or (ii) be physically co-located with an eNB or femtocell and provide NR coverage within a portion of the eNB macrocell coverage area, or (iii) be physically non-colocated with the eNB or femtocell, but still provide NR coverage within the macrocell coverage area.

In accordance with the 5G NR model, the DUe(s) 526 comprise logical nodes that each may include varying subsets of the gNB functions, depending on the functional split option. DUe operation is controlled by the CUe 524 (and ultimately for some functions by the NG Core 523). Split options between the DUe and CUe in the present disclosure may include for example:

Option 1 (RRC/PCDP split)
Option 2 (PDCP/RLC split)
Option 3 (Intra RLC split)
Option 4 (RLC-MAC split)
Option 5 (Intra MAC split)
Option 6 (MAC-PHY split)
Option 7 (Intra PHY split)
Option 8 (PHY-RF split)

Under Option 1 (RRC/PDCP split), the RRC (radio resource control) is in the CUe 524 while PDCP (packet data convergence protocol), RLC (radio link control), MAC, physical layer (PHY) and RF are kept in the DUe, thereby maintaining the entire user plane in the distributed unit.

Under Option 2 (PDCP/RLC split), there are two possible variants: (i) RRC, PDCP maintained in the CUe, while RLC, MAC, physical layer and RF are in the DU(s) 526; and (ii) RRC, PDCP in the CUe (with split user plane and control plane stacks), and RLC, MAC, physical layer and RF in the DUe's 526.

Under Option 3 (Intra RLC Split), two splits are possible: (i) split based on ARQ;
and (ii) split based on TX RLC and RX RLC.

Under Option 4 (RLC-MAC split), RRC, PDCP, and RLC are maintained in the CUe 524, while MAC, physical layer, and RF are maintained in the DUe's.

Under Option 5 (Intra-MAC split), RF, physical layer and lower part of the MAC layer (Low-MAC) are in the DUe's 526, while the higher part of the MAC layer (High-MAC), RLC and PDCP are in the CUe 524.

Under Option 6 (MAC-PHY split), the MAC and upper layers are in the CUe, while the PHY layer and RF are in the DUe's 526. The interface between the CUe and DUe's carries data, configuration, and scheduling-related information (e.g. Modulation and Coding Scheme or MCS, layer mapping, beamforming and antenna configuration, radio and resource block allocation, etc.) as well as measurements.

Under Option 7 (Intra-PHY split), different sub-options for UL (uplink) and DL downlink) may occur independently. For example, in the UL, FFT (Fast Fourier Transform) and CP removal may reside in the DUe's 526, while remaining functions reside in the CUe 524. In the DL, iFFT and CP addition may reside in the DUe 526, while the remainder of the PHY resides in the CUe 524.

Finally, under Option 8 (PHY-RF split), the RF and the PHY layer may be separated to, inter alia, permit the centralization of processes at all protocol layer levels, resulting in a high degree of coordination of the RAN. This allows optimized support of functions such as CoMP, MIMO, load balancing, and mobility.

Generally speaking, the foregoing split options are intended to enable flexible hardware implementations which allow scalable cost-effective solutions, as well as coordination for e.g., performance features, load management, and real-time performance optimization. Moreover configurable functional splits enable dynamic adaptation to various use cases and operational scenarios. Factors considered in determining how/when to implement such options can include: (i) QoS requirements for offered services (e.g. low latency to support 5G RAN requirements, high throughput); (ii) support of requirements for user density and load demand per given geographical area (which may affect RAN coordination); (iii) availability of transport and backhaul networks with different performance levels; (iv) application type (e.g. real-time or non-real time); (v) feature requirements at the Radio Network level (e.g. Carrier Aggregation).

It is also noted that the "DU" functionality referenced in the various split options above can itself be split across the DUe and its downstream components, such as the RF stages of the node 509 (see FIGS. 7 and 7a) and/or the CPEe 513. As such, the present disclosure contemplates embodiments where some of the functionality typically found within the DUe may be distributed to the node/CPEe.

It will further be recognized that user-plane data/traffic may also be routed and delivered apart from the CUe. In one implementation (described above), the CUe hosts both the RRC (control-plane) and PDCP (user-plane); however, as but one alternate embodiment, a so-called "dis-aggregated" CUe may be utilized, wherein a CUe-CP entity (i.e., CUe—control plane) hosts only the RRC related functions, and a CUe-UP (CUe—user plane) which is configured to host only PDCP/SDAP (user-plane) functions. The CUe-CP and CUe-UP entities can, in one variant, interface data and inter-process communications via an E1 data interface, although other approaches for communication may be used.

It will also be appreciated that the CUe-CP and CUe-UP may be controlled and/or operated by different entities, such as where one service provider or network operator maintains cognizance/control over the CUe-UP, and another over the CUe-CP, and the operations of the two coordinated according to one or more prescribed operational or service policies or rules.

Referring again to FIG. 5, the exemplary embodiment of the DUe 509 is a strand-mounted or buried DUe (along with the downstream radio chain(s), the latter which may include one or more partial or complete RRH's (remote radio heads) which include at least portions of the PHY functionality of the node (e.g., analog front end, DAC/ADCs, etc.). As can be appreciated, the location and configuration of each DUe/node may be altered to suit operational requirements such as population density, available electrical power service (e.g., in rural areas), presence of other closely located or co-located radio equipment, geographic features, etc.

As discussed with respect to FIGS. 7-7a below, the nodes 509 in the embodiment of FIG. 5 include multiple OFDM-based transmitter-receiver chains of 800 MHz nominal bandwidth, although this configuration is merely exemplary. In operation, the node generates waveforms that are transmitted in the allocated band (e.g., up to approximately 1.6 GHz), but it will be appreciated that if desired, the OFDM signals may in effect be operated in parallel with signals carried in the below-800 MHz band, such as for normal cable system operations.

As shown in FIG. 5, in one implementation, each node (and hence DUe) is in communication with its serving CUe via an F1 interface, and may be either co-located or not co-located with the CUe. For example, a node/DUe may be positioned within the MSO HFC infrastructure proximate a distribution node within the extant HFC topology, such as before the N-way tap point 512, such that a plurality of premises (e.g., the shown residential customers) can be served by the node/DUe via the aforementioned OFDM waveforms and extant HFC plant. In certain embodiments, each node/DUe 509, 526 is located closer to the edge of the network, so as to service one or more venues or residences (e.g., a building, room, or plaza for commercial, corporate, academic purposes, and/or any other space suitable for wireless access). For instance, in the context of FIG. 5, a node might even comprise a CPEe or external access node (each discussed elsewhere herein). Each radio node 506a is configured to provide wireless network coverage within its coverage or connectivity range for its RAT (e.g., 4G and/or 5G NR). For example, a venue may have a wireless NR modem (radio node) installed within the entrance thereof for prospective customers to connect to, including those in the parking lot via inter alia, their NR or LTE-enabled vehicles or personal devices of operators thereof.

Notably, different classes of DUe/node 509, 526 may be utilized. For instance, a putative "Class A" LTE eNB may transmit up X dbm, while a "Class-B" LTE eNBs can transmit up to Y dbm (Y>X), so the average area can vary widely. In practical terms, a Class-A device may have a working range on the order of hundreds of feet, while a Class B device may operate out to thousands of feet or more, the propagation and working range dictated by a number of factors, including the presence of RF or other interferers, physical topology of the venue/area, energy detection or sensitivity of the receiver, etc. Similarly, different types of NR-enabled nodes/DUe 509, 526 can be used depending on these factors, whether alone or with other wireless PHYs such as WLAN, etc.

Signal Attenuation and Bandwidth

Figure 6A:
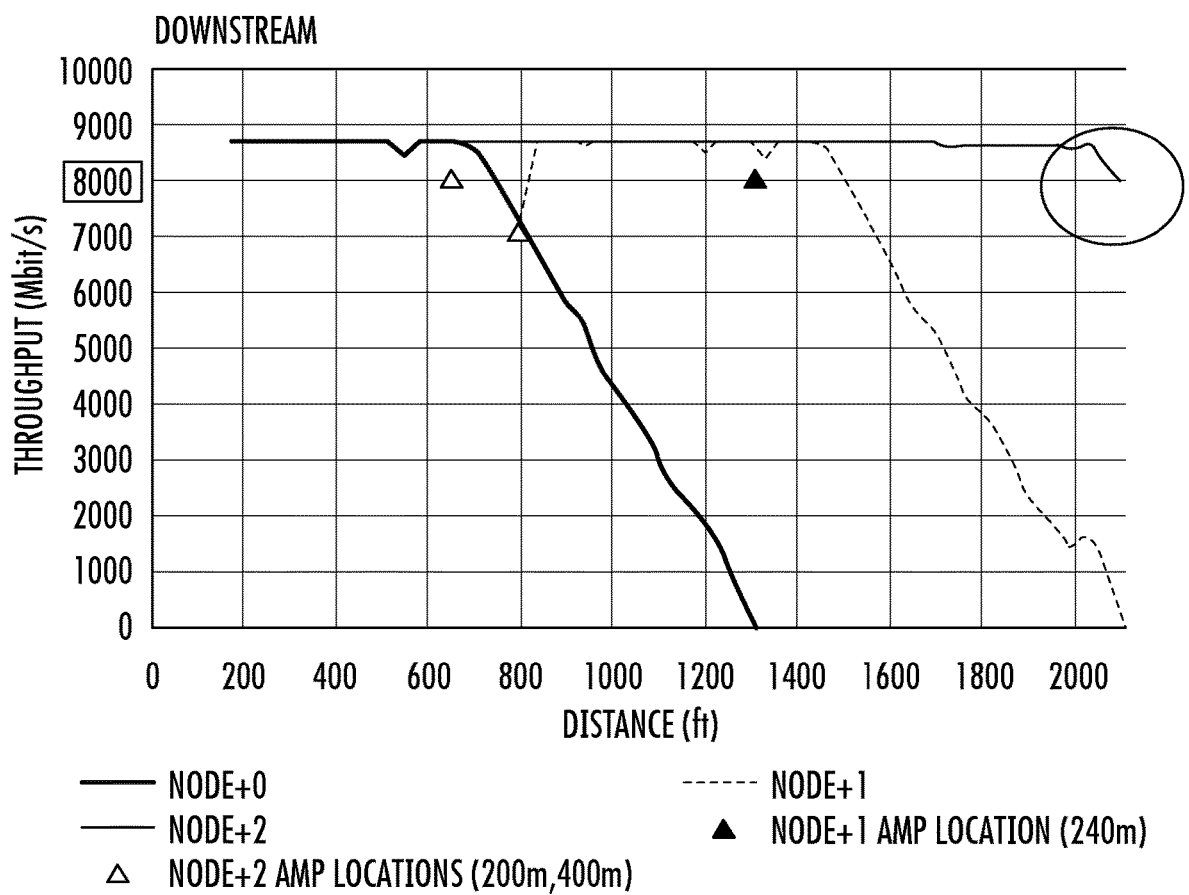
FIGS. 6a and 6b illustrate exemplary downstream (DS) and upstream (US) data throughputs or rates as a function of distance within the HFC cable plant of FIG. 5.
Figure 6B:
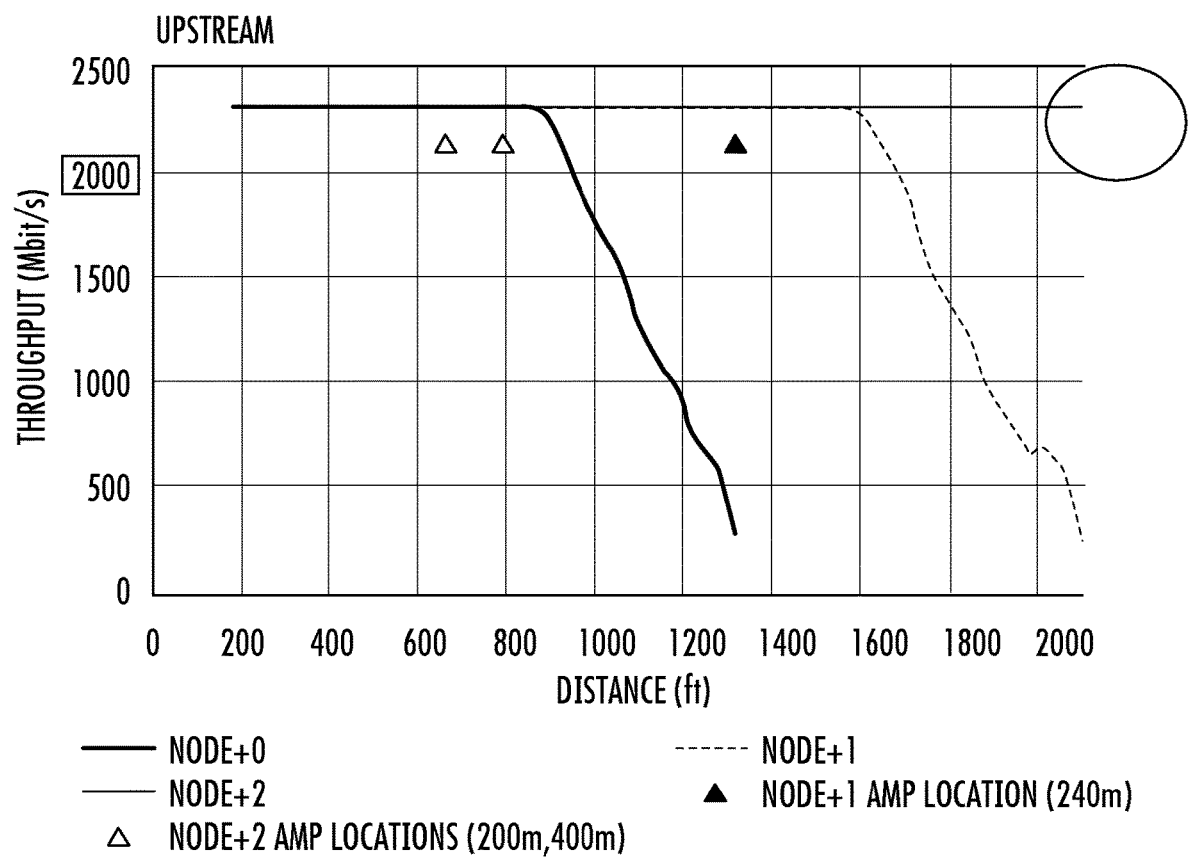

FIGS. 6a and 6b illustrate exemplary downstream (DS) and upstream (US) data throughputs or rates as a function of distance within the HFC cable plant of FIG. 5. As illustrated, a total (DS and US combined) bandwidth on the order of 10 Gbps is achievable (based on computerized simulation conducted by the Assignee hereof), at Node+2 at 2100 ft (640 m), and at Node+1 at 1475 ft (450 m). One exemplary split of the aforementioned 10 Gbps is asymmetric; e.g., 8 Gbps DL/2 Gbps UL, although this may be dynamically varied using e.g., TDD variation as described elsewhere herein.

Figure 2:
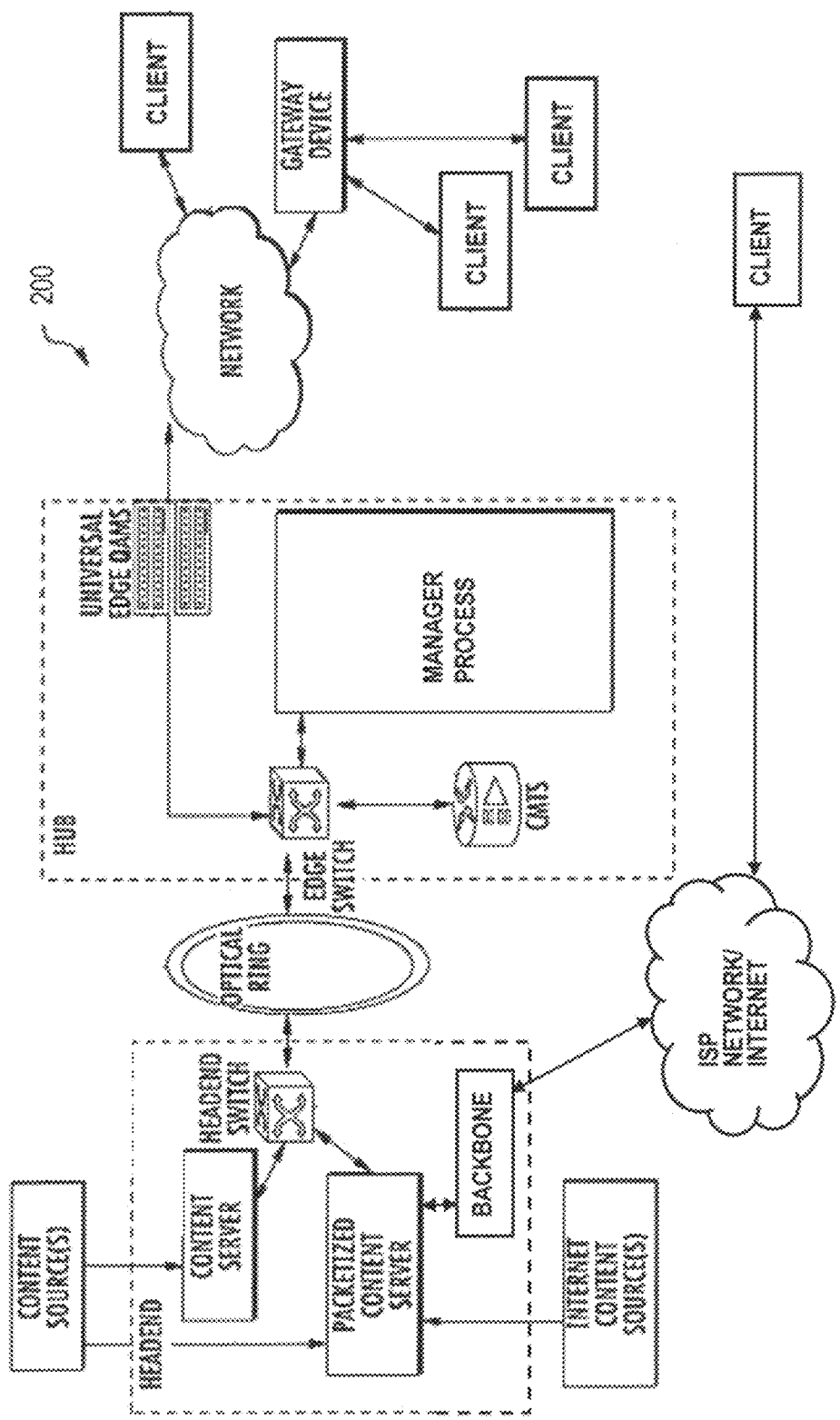
Figure 3:
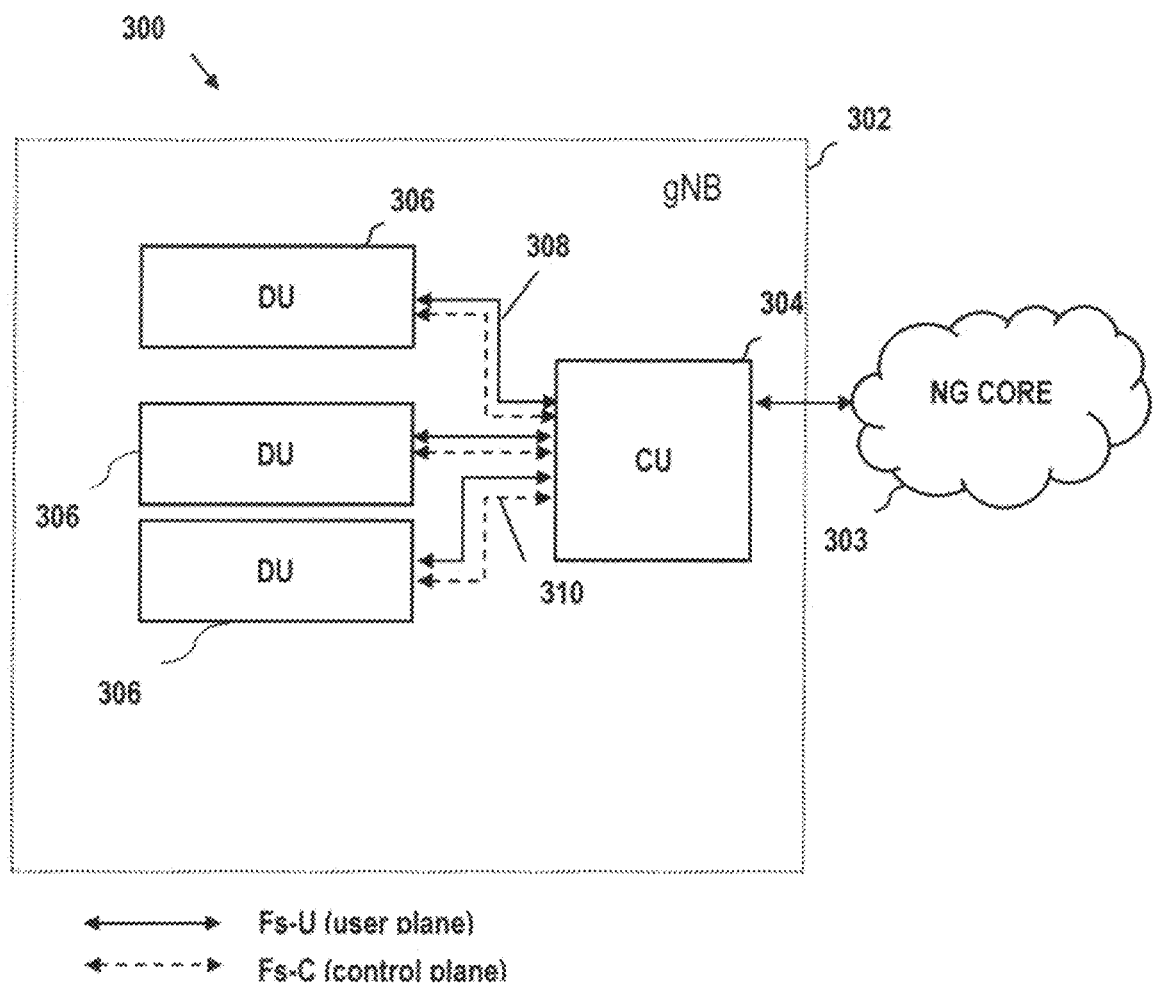
FIG. 3 is a functional block diagram of a prior art gNB architecture including CU and multiple DUs.
Figure 4A:
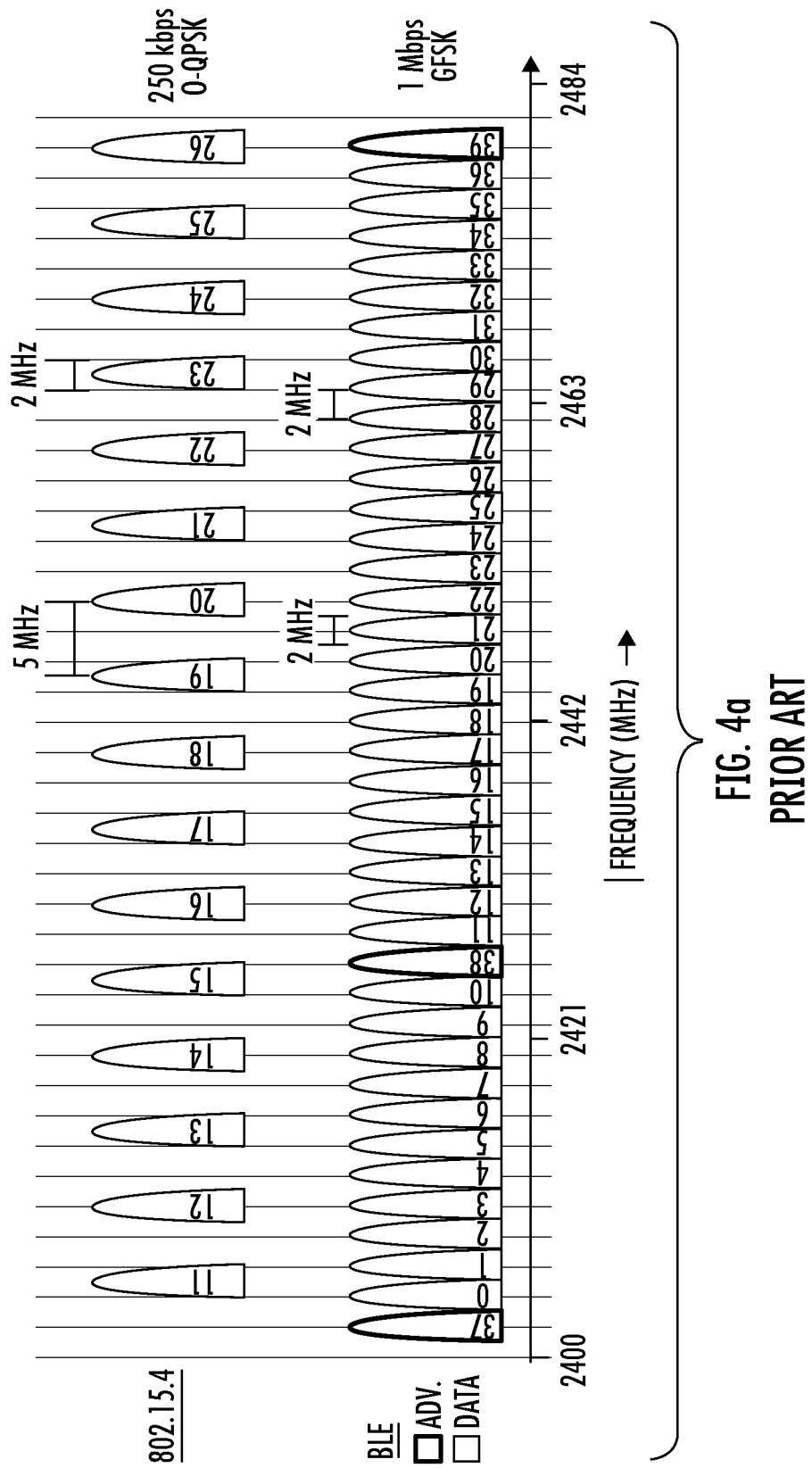
FIG. 4a is a graphical representation of frequency bands associated with prior art IEEE Std. 802.15.4 and Bluetooth Low Energy (BLE) wireless interfaces.
Figure 4B:
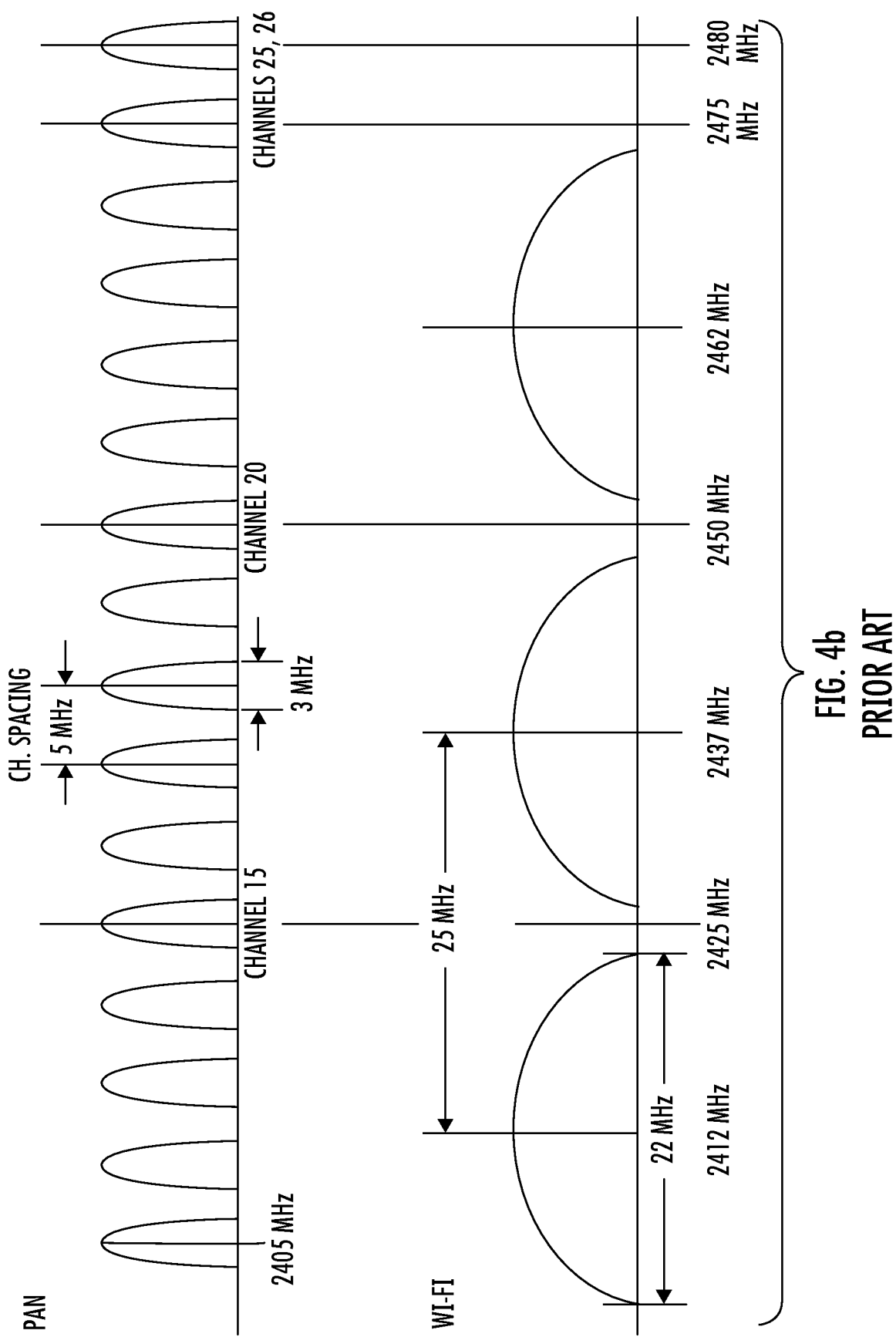
FIG. 4b is a graphical representation of frequency bands associated with prior art IEEE Std. 802.15.4 and Wi-Fi wireless interfaces.

Notably, the portions of the extant HFC architecture described above (see e.g., FIGS. 1 and 2) utilized by the architecture 500 of FIG. 5 are not inherently limited by their medium and architecture (i.e., optical fiber transport ring, with coaxial cable toward the edges); coaxial cable can operate at frequencies significantly higher than the sub-1 GHz typically used in cable systems, but at a price of significantly increased attenuation. As is known, the formula for theoretical calculation of attenuation (A) in a typical coaxial cable includes the attenuation due to conductors plus attenuation due to the dielectric medium:

$$A = 4.35 \, (R_t/Z_0) + 2\sqrt{E} \, 78 \, pF.$$
$$= dB \text{ per } 100 \text{ ft}$$

where:
$R_t$=Total line resistance ohms per 1000 ft
$R_t$=0.1 (1/d+1√FD)
(for single copper line)
P=Power factor of dielectric
F=Frequency in megahertz (MHz)

As such, attenuation increases with increasing frequency, and hence there are practical restraints on the upper frequency limit of the operating band. However, these restraints are not prohibitive in ranges up to for example 2 GHz, where with suitable cable and amplifier manufacturing and design, such coaxial cables can suitably carry RF signals without undue attenuation. Notably, a doubling of the roughly 800 MHz-wide typical cable RF band (i.e., to 1.6 GHz width) is very possible without suffering undue attenuation at the higher frequencies.

It will also be appreciated that the attenuation described above is a function of, inter alia, coaxial conductor length, and hence higher levels of "per-MHz" attenuation may be acceptable for shorter runs of cable. Stated differently, nodes serviced by shorter runs of cable may be able to better utilize the higher-end portions of the RF spectrum (e.g., on the high end of the aforementioned exemplary 1.6 GHz band) as compared to those more distant, the latter requiring greater or disproportionate amplification. As such, the present disclosure contemplates use of selective mapping of frequency spectrum usage as a function of total cable medium run length or similar.

Another factor of transmission medium performance is the velocity factor (VF), also known as wave propagation speed or velocity of propagation (VoP), defined as the ratio of the speed at which a wavefront (of an electromagnetic or radio frequency signal, a light pulse in an optical fiber or a change of the electrical voltage on a copper wire) propagates over the transmission medium, to the speed of light (c, approximately 3E08 m/s) in a vacuum. For optical signals, the velocity factor is the reciprocal of the refractive index. The speed of radio frequency signals in a vacuum is the speed of light, and so the velocity factor of a radio wave in a vacuum is 1, or 100%. In electrical cables, the velocity factor mainly depends on the material used for insulating the current-carrying conductor(s). Velocity factor is an important characteristic of communication media such as coaxial, CAT-5/6 cables, and optical fiber. Data cable and fiber typically has a VF between roughly 0.40 and 0.8 (40% to 80% of the speed of light in a vacuum).

Achievable round-trip latencies in LTE (UL/DL) are on the order of 2 ms (for "fast" UL access, which eliminates need for scheduling requests and individual scheduling grants, thereby minimizing latency, and shorter TTI, per Release 15), while those for 5G NR are one the order of 1 ms or less, depending on transmission time interval frequency (e.g., 60 kHz).

Notably, a significant portion of 4G/4.5G transport latency relates to network core and transport (i.e., non-edge) portions of the supporting infrastructure.

Hence, assuming a nominal 0.7 VF and a one (1) ms roundtrip latency requirement, putative service distances on the order of 100 km are possible, assuming no other processing or transport latency:

$$0.5E\text{-}03 \text{ s (assume symmetric US/DS)} \times (0.7 \times 3E08 \text{ m/s}) \times 1 \text{ km}/1000\text{m} = 1.05E02 \text{ km}$$

Network Node and DUe Apparatus—

Figure 7:
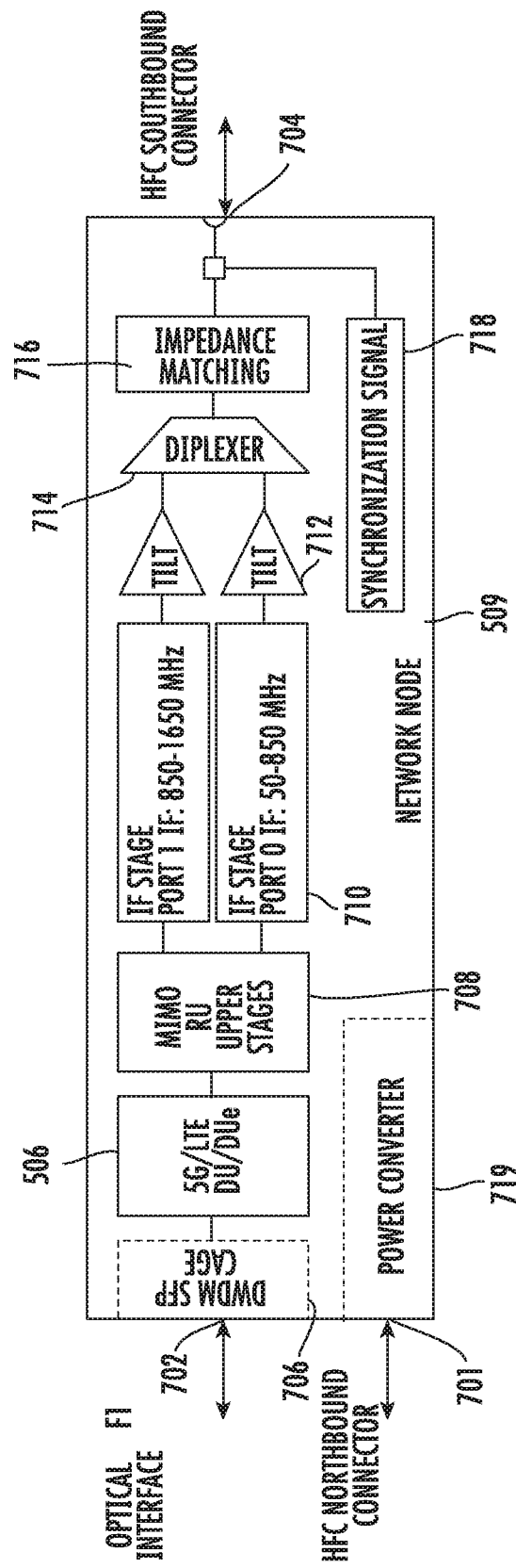
FIG. 7 is a functional block diagram illustrating an exemplary general configuration of a network node apparatus according to the present disclosure.
Figure 7A:
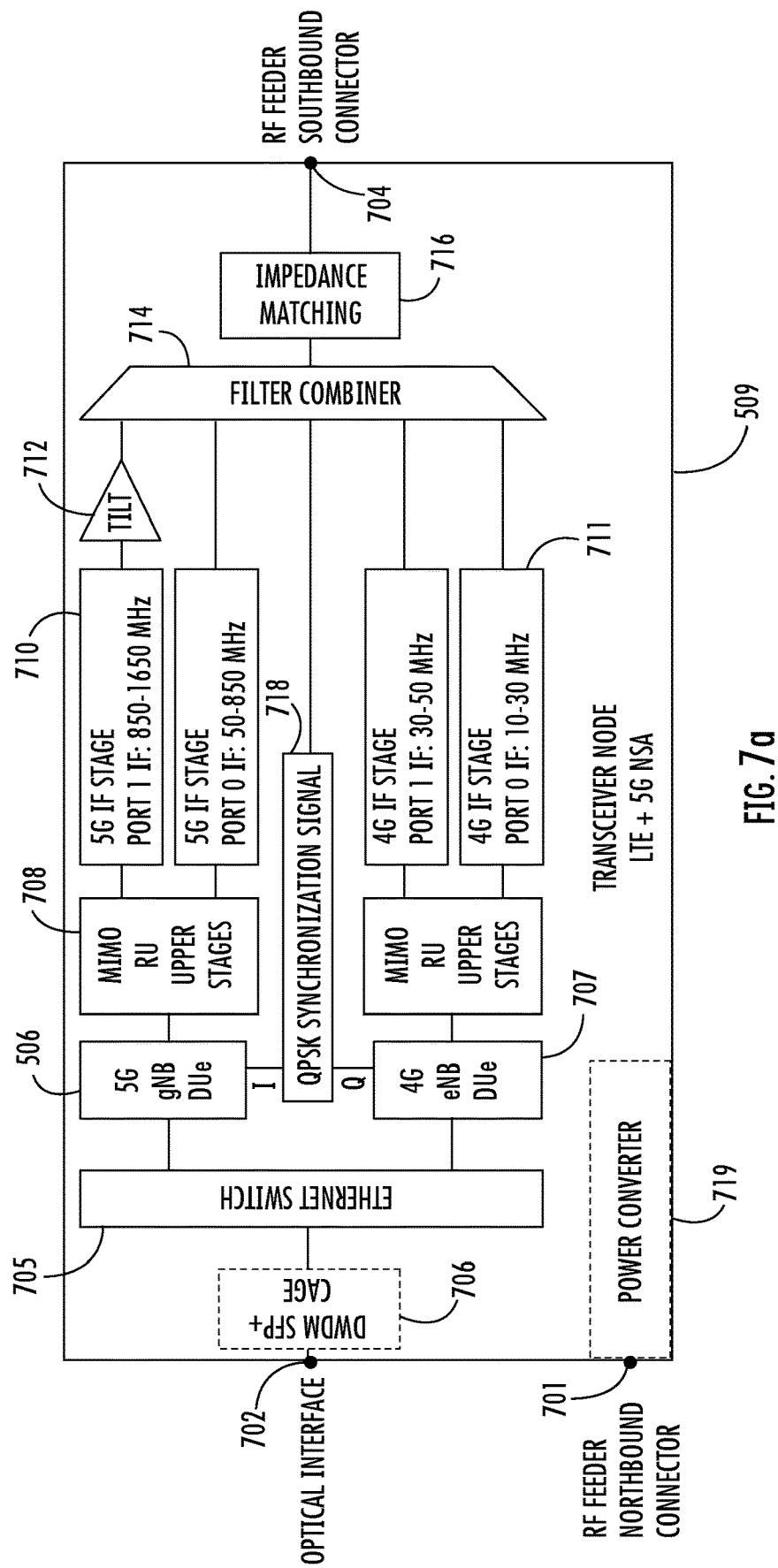
FIG. 7a is a functional block diagram illustrating an exemplary implementation of the network node apparatus according to the present disclosure, configured for 3GPP 4G and 5G capability.

FIGS. 7 and 7a illustrate exemplary configurations of a network radio frequency node apparatus 509 according to the present disclosure. As referenced above, these nodes 509 can take any number of form factors, including (i) co-located with other MSO equipment, such as in a physically secured space of the MSO, (ii) "strand" or pole mounted, (iii) surface mounted, and (iv) buried, so as to inter alia, facilitate most efficient integration with the extant HFC (and optical) infrastructure, as well as other 4G/5G components such as the CUe 504.

As shown, in FIG. 7, the exemplary node 509 in one embodiment generally includes an optical interface 702 to the HFC network DWDM system (see FIG. 2), as well as a "Southbound" RF interface 704 to the HFC distribution network (i.e., coax). The optical interface 702 communicates with an SFP connector cage 706 for receiving the DWDM signals via the interposed optical fiber. A 5G NR DUe 506 is also included to provide 5G DU functionality as previously described, based on the selected option split. The MIMO/radio unit (RU) stages 708 operate at baseband, prior to upconversion of the transmitted waveforms by the IF (intermediate frequency) stages 710 as shown. As discussed below, multiple parallel stages are used in the exemplary embodiment to capitalize on the multiple parallel data streams afforded by the MIMO technology within the 3GPP technology. A tilt stage 712 is also utilized prior to the diplexer stage 714 and impedance matching stage 716. Specifically, in one implementation, this "tilt" stage is used to compensate for non-linearity across different frequencies carried by the medium (e.g., coaxial cable). For instance, higher frequencies may have a higher loss per unit distance when travelling on the medium as compared to lower frequencies travelling the same distance on the same medium. When a high bandwidth signal (e.g. 50-1650 MHz) is transmitted on a coax line, its loss across the entire frequency bandwidth will not be linear, and may include shape artifacts such as a slope (or "tilt"), and/or bends or "knees" in the attenuation curve (e.g., akin to a low-pass filter). Such non-linear losses may be compensated for to achieve optimal performance on the medium, by the use of one or more tilt compensation apparatus 712 on the RF stage of the node device.

A synchronization signal generator 718 is also used in some embodiments as discussed in greater detail below with respect to FIG. 7a.

In the exemplary implementation of FIG. 7a, both 4G and 5G gNB DUe 707, 506 are also included to support the RF chains for 4G and 5G communication respectively. As described in greater detail below, the 5G portion of the spectrum is divided into two bands (upper and lower), while the 4G portion is divided into upper and lower bands within a different frequency range. In the exemplary implementation, OFDM modulation is applied to generate a plurality of carriers in the time domain. See, e.g., co-owned and co-pending U.S. Pat. No. 9,185,341 issued Nov. 10, 2015 and entitled "Digital domain content processing and distribution apparatus and methods," and U.S. Pat. No. 9,300,445 issued Mar. 29, 2016 also entitled "Digital domain content processing and distribution apparatus and methods," each incorporated herein by reference in their entirety, for inter alia, exemplary reprogrammable OFDM-based spectrum generation apparatus useful with various embodiments of the node 509 described herein.

In the exemplary embodiment, the 5G and LTE OFDM carriers produced by the node 509 utilize 1650 MHz of the available HFC bearer bandwidth, and this bandwidth is partitioned into two or more sub-bands depending on e.g., operational conditions, ratio of "N+0" subscribers served versus "N+i" subscribers served, and other parameters. In one variant, each node utilizes RF power from its upstream nodes to derive electrical power, and further propagate the RF signal (whether at the same of different frequency) to downstream nodes and devices including the wideband amplifiers.

While the present embodiments are described primarily in the context of an OFDM-based PHY (e.g., one using IFFT and FFT processes with multiple carriers in the time domain) along with TDD (time division duplex) temporal multiplexing, it will be appreciated that other PHY/multiple access schemes may be utilized consistent with the various aspects of the present disclosure, including for example and without limitation FDD (frequency division duplexing), direct sequence or other spread spectrum, and FDMA (e.g., SC-FDMA or NB FDMA).

As a brief aside, to achieve high throughput using a single receiver chipset in the consumer premises equipment (CPEe) 513 and 3GPP 5G NR waveforms over a single coaxial feeder, such as the coaxial cable that MSOs bring to their subscriber's premises or the single coaxial cable that is installed for lower-cost single input single output (SISO) distributed antenna systems (DAS), the total carrier bandwidth that can be aggregated by the chipset is limited to a value, e.g. 800 MHz, which is insufficient for reaching high throughputs such as 10 Gbit/s using one data stream alone given the spectral efficiencies supported by the 3GPP 5G NR standard.

Since the 3GPP 5G NR standard supports the transmission of multiple independent parallel data streams as part of a multiple input multiple output (MIMO) channel for the same RF bandwidth to leverage the spatial diversity that wireless channels afford when multiple antenna elements are used, the very first generation of 3GPP 5G chipsets will support such parallel MIMO data streams. However, attempts to transmit these parallel streams over a single cable would generally be counterproductive, as all the streams would occupy the same RF bandwidth and would interfere with each other for lack of spatial diversity between them.

Accordingly, the various embodiments disclosed herein (FIGS. 7 and 7a) leverage the parallel MIMO data streams supported by 3GPP 5G NR, which are shifted in frequency in a transceiver node before being injected into the single coaxial feeder so that frequency diversity (instead of spatial diversity; spatial diversity may be utilized at the CPEe and/or supplemental pole-mounted radio access node if desired) is leveraged to achieve the maximum total carrier bandwidth that 3GPP 5G NR chipsets will support with parallel data streams.

Also, since higher frequencies attenuate much more over the coaxial transmission media than lower frequencies, in one variant the Intermediate Frequencies (IF) are transmitted over the media, and block-conversion to RF carrier frequency is employed subsequently in the consumer premises equipment (CPEe) 513 for 3GPP band-compliant interoperability with the 3GPP 5G NR chipset in the CPEe. In this fashion, attenuation that would otherwise be experienced by conversion earlier in the topology is advantageously avoided.

The IF carriers injected by the transceiver node into the coaxial feeder 704 can be received by multiple CPEe 513 that share the feeder as a common bus using directional couplers and power dividers or taps. Point-to-Multipoint (PtMP) downstream transmissions from the node 509 to the CPEe 513 can be achieved by, for instance, scheduling payload for different CPEe on different 3GPP 5G NR physical resource blocks (PRB) which are separated in frequency.

In the exemplary embodiment, the vast majority of bandwidth in the coaxial cable bearer is used in Time Division Duplex (TDD) fashion to switch between downstream (DS) and upstream (US) 5G NR communications. Upstream communications from the multiple CPEe 513 to the transceiver node can also/alternatively occur simultaneously over separate PRBs (frequency separation).

In one variant (see FIG. 7*a*), a minor portion of the lower spectrum (since lower frequencies attenuate less on the cable) is allocated to a 3GPP 4G LTE MIMO carrier with up to two parallel streams of 20 MHz bandwidth for a total of 40 MHz. This is performed since 3GPP Release 15 only supports 5G NR in Non-Standalone (NSA) mode, whereby it must operate in tandem with a 4G LTE carrier. Just as with the parallel 5G streams, the two parallel LTE MIMO streams are to be offset in frequency so as to not interfere with each other and are configured in the exemplary embodiment to operate in TDD mode.

As an aside, 5G NR supports adaptive TDD duty cycles, whereby the proportion of time allocated for downstream and upstream transmissions can be adapted to the net demand for traffic from the total set of transmitting network elements, viz. the node and all the CPEe 513 sharing the coaxial bus with the node. 4G LTE does not support such adaptive duty cycles. To prevent receiver blocking in the likely scenario that the 5G and 4G duty cycles differ, high-rejection filter combiners 714 are used in all active network elements, viz. transceiver nodes, inline amplifiers and CPEe 513 for the 4G and 5G carriers to not interfere with each other or cause receiver blocking. In the exemplary diplexer of FIG. 7*a*, both 4G and 5G are addressed via a high-rejection filter to allow for different duty cycles.

In one variant, another minor portion of the lower spectrum on the coaxial cable employs one-way communication in the downstream for the transmission of two digital synchronization channels, one for 5G and one for 4G, which are I-Q multiplexed onto one QPSK analog synchronization channel within the aforementioned "minor portion" from the signal generator 718 of the transceiver node 509 to the multiple inline amplifiers and CPEe 513 that may be sharing the coaxial bus. These synchronization channels aid coherent reception of the PRBs, and in one variant command the network elements to switch between downstream and upstream communication modes according to the TDD duty cycle set by the transceiver node 509. In the exemplary configuration, two digital synchronization channels are required since the 5G and 4G streams may have different upstream-downstream ratios or duty-cycles. Since lower frequencies attenuate less on the cable, the synchronization channel is in one implementation transmitted over a lower portion of the spectrum on the cable so that it reaches every downstream network element and CPEe. In one variant, an analog signal is modulated with two bits, where one bit switches according to the duty cycle for the 4G signal, and the other bit switches according to the duty cycle of the 5G signal, although other approaches may be utilized.

The connectivity between the transceiver node 509 and the northbound network element is achieved with a fiber optic link 702 to the MSO DWDM plant. To minimize the number of fiber channels required to feed the transceiver node 509, and to restrict it to a pair of fiber strands, in one embodiment the 3GPP 5G NR F1 interface (described supra) is realized over the fiber pair to leverage the low overhead of the F1 interface. The 3GPP 5G NR Distribution Unit (DUe) functionality is incorporated into the transceiver node 509 as previously described, since the F1 interface is defined between the Central Unit (CU/CUe) and DU/DUe where, in the illustrated embodiment, the CUe and DUe together constitute a 3GPP 5G NR base station or gNB (see FIGS. 5*a*-5*c*).

An Ethernet switch 705 is also provided at the optical interface in the embodiment of FIG. 7*a* to divide the backhaul into the 4G and 5G data paths (e.g., the received upstream 4G and 5G signals are respectively routed differently based on the switch 705). The exemplary node 509 also includes a power converter 719 to adapt for internal use of quasi-square wave low voltage power supply technology over HFC used by DOCSIS network elements as of the date of this disclosure. The node 509 in one variant is further configured to pass the quasi-square wave low voltage power received on the input port 701 through to the HFC output port 704 to other active network elements such as e.g., amplifiers, which may be installed downstream of the node on the HFC infrastructure.

It is noted that as compared to some extant solutions, the illustrated embodiment of FIGS. 5 and 7-7*a* uses HFC versus twisted pair to feed the CPEe 513; HFC advantageously provides lower loss and wider bandwidths than twisted pair, which is exploited to provide 5G throughputs to farther distances, and to leverage the large existing base of installed coaxial cable. Moreover, the foregoing architecture in one implementation is configured to serve multiple CPEe 513 using directional couplers and power dividers or taps to attach to a common coaxial bus which connects to a single interface at the transceiver node. The aforementioned Ethernet services (necessary to service an external Wi-Fi access-point and an integrated Wi-Fi router) are further added in other implementations to provide expanded capability, in contrast to the existing solutions.

CPEe Apparatus—

Figure 8:
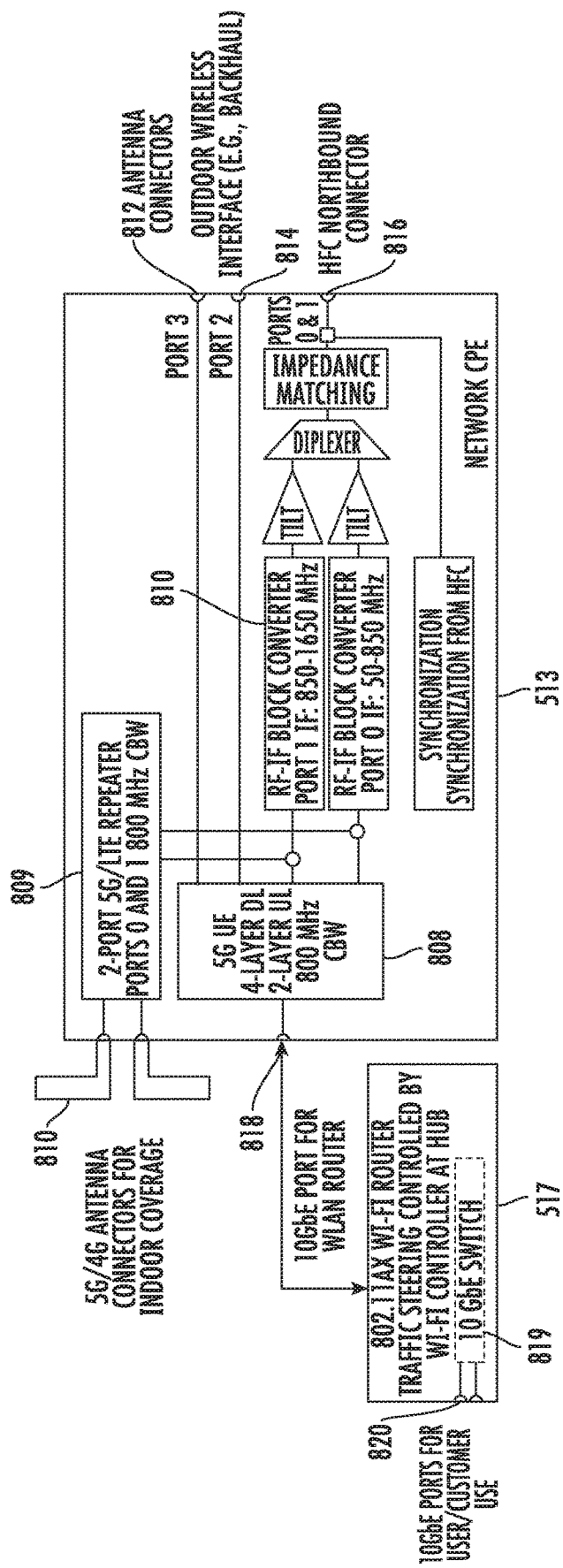
FIG. 8 is a functional block diagram illustrating an exemplary general configuration of a CPEe apparatus according to the present disclosure.

FIG. 8 illustrates an exemplary configuration of a CPEe apparatus 513 according to the present disclosure. As shown, the CPEe 513 generally an RF input interface 816 to the HFC distribution network (i.e., coax drop at the premises). A transmitter/receiver architecture generally symmetrical to the transmitter/receiver of the node 509 discussed previously is used; i.e., impedance matching circuitry, diplexer, synchronization circuit, tilt, etc. are used as part of the CPEe RF front end. Block converters 810 are used to convert to and from the coaxial cable domain bands (here, 50-850 and 850-1650 MHz) to the premises domain, discussed in greater detail below.

The exemplary CPEe 513 also includes a 5G UE process 808 to implement 3GPP functionality of the UE within the CPEe, and 3GPP (e.g., 5G/LTE) repeater module 809 which includes one or more antennae elements 810 for indoor/premises coverage within the user RF band(s). As such, the CPEe 513 shown can in effect function as a base station for user devices within the premises operating within the user band(s).

A 10 GbE WLAN port 818 is also included, which interfaces between the UE module 808 and the (optional) WLAN router 517 with internal 10 GbE switch 819) to support data interchange with premises WLAN infrastructure such as a Wi-Fi AP.

Also shown in the configuration of FIG. 8 are several external ports 812, 814 for external antenna 516 connection (e.g., roof-top antenna element(s) used for provision of the supplemental data link as previously described with respect to FIG. 5), wireless high-bandwidth backhaul, or other functions.

Figure 8A:
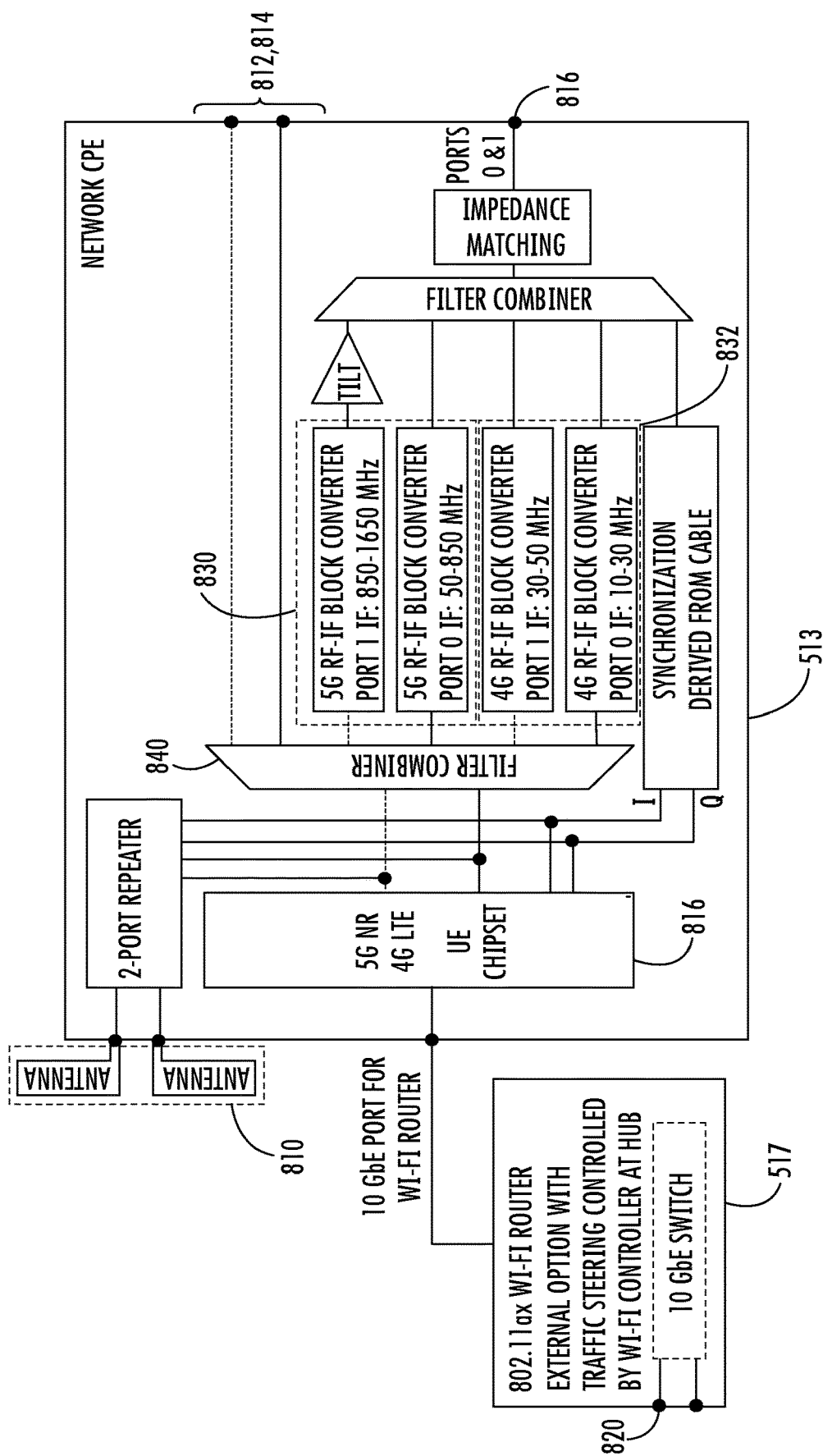
FIG. 8a is a functional block diagram illustrating an exemplary implementation of a CPEe apparatus according to the present disclosure, configured for 3GPP 4G and 5G capability.

In the exemplary implementation of FIG. 8*a*, both 4G and 5G gNB block converters 832, 830 are included to support the RF chains for 4G and 5G communication respectively (i.e., for conversion of the IF-band signals received to the relevant RF frequencies of the 4G/5G interfaces and modems within the CPEe, such as in the 2 GHz band. The block converters also enable upstream communication with the distribution node 509 via the relevant IF bands via the coaxial input 816 as previously described.

Notably, the CPEe 513 applies block-conversion between the IF and RF carrier frequency for the 4G and 5G carrier separately since they may be on different frequency bands. The CPEe includes in one implementation a 5G NR and 4G LTE-capable user equipment (UE) chipset 816. The two technologies are supported in this embodiment, since the first release of 3GPP 5G NR requires 4G and 5G to operate in tandem as part of the non-standalone (NSA) configuration.

It is noted that in the exemplary configuration of FIG. 8*a* (showing the lower frequencies in 4G combined with 5G), a filter combiner is used (in contrast to the more generalized approach of FIG. 8).

It is also noted that the specific implementation of FIG. 8*a* utilizes "tilt" compensation as previously described on only one of the RF-IF block converters 830. This is due to the fact that the need for such compensation arises, in certain cases such as coaxial cable operated in the frequency band noted) disproportionately at the higher frequencies (i.e., up to 1650 MHz in this embodiment). It will be appreciated however that depending on the particular application, different compensation configurations may be used consistent with the present disclosure. For example, in one variant, the upper-band block converters 830 may be allocated against more granular frequency bands, and hence tilt/compensation applied only in narrow regions of the utilized frequency band (e.g., on one or two of four % G RF-IF block converters). Similarly, different types of tilt/compensation may be applied to each block converter (or a subset thereof) in heterogeneous fashion. Various different combinations of the foregoing will also be appreciated by those of ordinary skill given the present disclosure.

Block conversion to the RF frequency makes the signals 3GPP band-compliant and interoperable with the UE chipset in the CPEe 513. The RF carriers are also then amenable for amplification through the included repeater 809 for 4G and 5G which can radiate the RF carriers, typically indoors, through detachable external antennas 810 connected to the CPEe. Mobile devices such as smartphones, tablets with cellular modems and IoT devices can then serve off of the radiated signal for 4G and 5G service (see discussion of FIGS. 9*a* and 9*b* below).

The UE chipset 816 and the repeater 809 receive separate digital I/Q synchronization signals, one for 4G and one for 5G, for switching between the downstream and upstream modes of the respective TDD carriers, since they are likely to have different downstream-to-upstream ratios or duty cycle. These two digital synchronization signals are received from an I-Q modulated analog QPSK signal received from lower-end spectrum on the coaxial cable that feeds the CPEe 513 via the port 816.

As noted, in the exemplary implementation, OFDM modulation is applied to generate a plurality of carriers in the time domain at the distribution node 509; accordingly, demodulation (via inter alia, FFT) is used in the CPEe to demodulate the IF signals. See, e.g., co-owned and co-pending U.S. Pat. No. 9,185,341 issued Nov. 10, 2015 and entitled "Digital domain content processing and distribution apparatus and methods," and U.S. Pat. No. 9,300,445 issued Mar. 29, 2016 also entitled "Digital domain content processing and distribution apparatus and methods," each incorporated herein by reference in their entirety, for inter alia, exemplary reprogrammable OFDM-based receiver/demodulation apparatus useful with various embodiments of the CPEe 513 described herein.

Similar to the embodiment of FIG. 8, a 10 Gbe Ethernet port is also provided to support operation of the WLAN router 517 in the device of FIG. 8*a*, including for LAN use within the served premises.

Further, to boost the broadband capacity beyond the capacity available through the primary coaxial cable link and to add a redundant connection for higher reliability (which could be important for small businesses, enterprises, educational institutions, etc.), two additional RF interfaces on the CPEe of FIG. 8*a* are included for connecting the CPEe to a 2-port external antenna 516 which is installed outdoors, e.g., on the roof of the small business, multi-dwelling unit (MDU) or multi-story enterprise (see FIG. 9*a*). This external antenna can be used to receive supplemental signals from outdoor radios installed in the vicinity of the consumer premises. It will be appreciated that the outdoor radios may have a primary purpose of providing coverage for outdoor mobility, but signals from them can also/alternatively be used in a fixed-wireless manner to supplement the capacity from the primary coaxial link and to add redundancy, as described elsewhere herein.

Supplemental Link and Mobility Enhancement—

In a further embodiment of the architecture 500, a supplemental or complementary data link 902 is utilized to provide additional data capacity (and redundancy to the primary link in the event of an equipment or other failure), as shown in FIG. 9*a*. In this configuration, data rates on the order of 21 Gbps can be achieved based on computer modeling by the Assignee hereof; e.g., 17 Gbps DS and 4 Gbps US. The supplemental link in one variant includes a 5G NR wireless interface between a pole-mounted or other external radio access node 506*a*, and the premises transceiver (which in one embodiment includes the CPEe 513 with added antenna capability 516. As used in the present context, the terms "pole-mounted" and "external" refer without limitation to any mounting placement or location which can establish a connection or data connectivity with e.g., the supplemental antenna 516 (e.g., roof-top or outdoor antenna) of the CPEe. Such mounting may be outdoor or within a large structure (e.g., a sports stadium, large building complex, and may be only temporary or semi-permanent in some implementations.

Figure 9B:
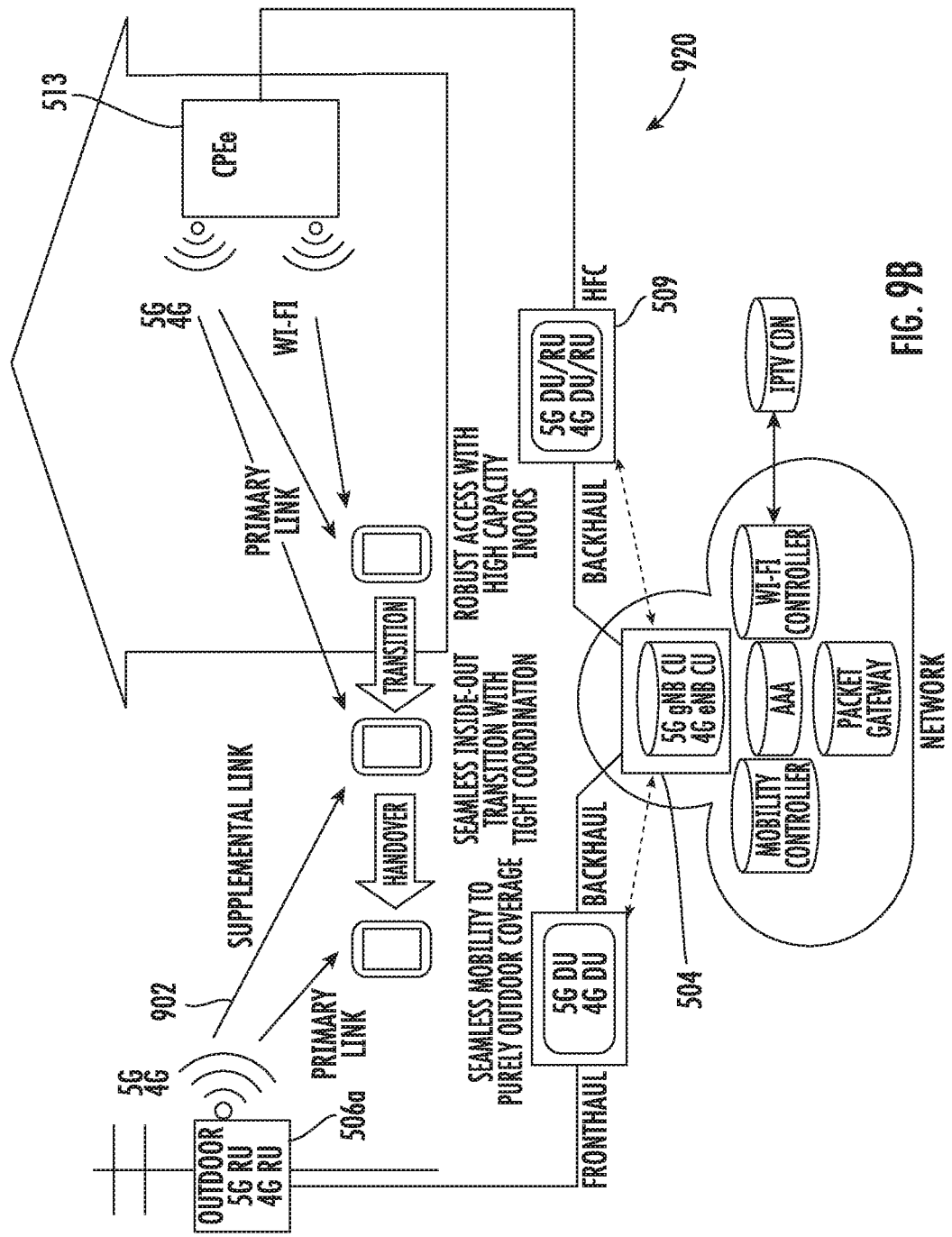
FIG. 9b is a block diagram illustrating an exemplary embodiment of a supplemental wireless link architecture supporting indoor/outdoor mobility transitions, according to the present disclosure.

FIG. 9*b* illustrates an exemplary embodiment of a network architecture 920 according to the present disclosure, including use of a supplemental link 902 in support of "seamless" mobility of a mobile user device.

Advantageously, as shown in FIG. 9b, the use of common waveforms and protocols over HFC and wireless in exemplary embodiments of the architecture 500 allow the use of common network elements such as centralized authentication, authorization, and accounting (AAA) functions, packet gateway and mobility controller (MME) and a common base station for indoor and outdoor areas within a service area, provided the base station is split into a central unit (CUe) and distribution unit (DUe) as described elsewhere herein. It is expected that such a split base station architecture can be ported back to 3GPP 4G/4.5G LTE/A as well.

As illustrated in FIG. 9b, the commonality of network elements advantageously enables seamless mobility experience between indoor and outdoor spaces of the served premises, in part because macro network-grade network elements with high signaling capacity and data throughput capacity control both spaces. Mobility between these spaces by devices such as phones and IoT modems trigger the least amount of signaling toward "northbound" network elements because, in many cases, mobility is constrained between distribution units (DUe 506) connected to a common Central Unit (CUe 504) as illustrated by the dashed lines in FIG. 9b, and generally in FIG. 5.

Moreover, as previously described, data throughput performance-triggered mobility between 3GPP and Wi-Fi is provided using a centralized Wi-Fi controller connected to a 3GPP mobility controller which services both indoor and outdoor spaces and with Wi-Fi access points cooperating with the Wi-Fi controller 515.

Figure 10:
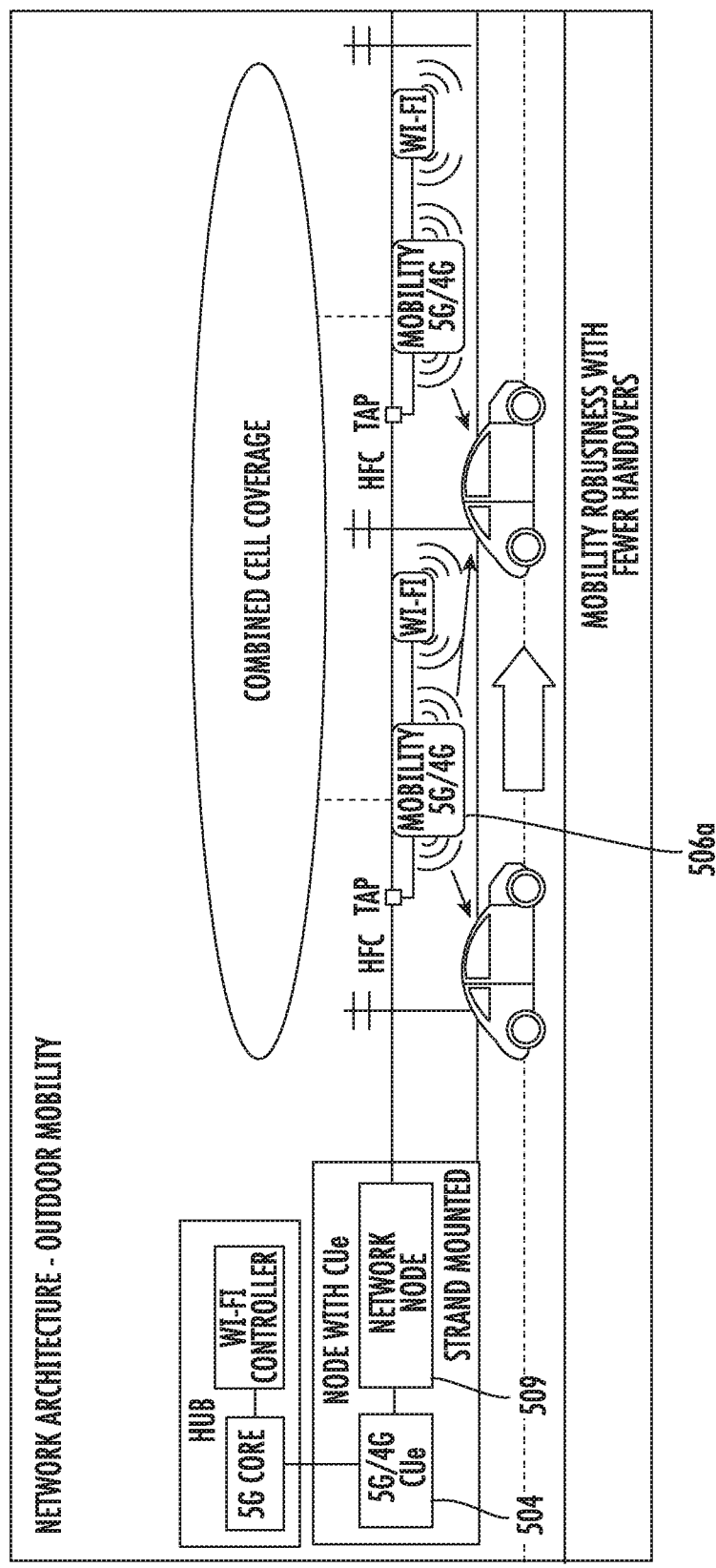
FIG. 10 is a block diagram illustrating an exemplary embodiment of a wireless link architecture supporting outdoor mobility via combined cell coverage, according to the present disclosure.

In another embodiment, one or more external (exterior) mobility node devices are utilized to provide outdoor mobility to users/subscribers, including in-vehicle use scenarios. As shown in FIG. 10, the "combined" cell coverage is large due to the unified common architecture of the system; no MSO-to-MNO (or vice versa) handovers are required while the vehicle remains in the combined cell coverage area served by the MSO, whether under WLAN APs or the 4G/5G external access nodes (which in one embodiment, may include the pole-mounted devices 506a shown in FIG. 5, and/or other devices such as those co-located at cellular base station sites). Specifically, by virtue of the common operator (e.g., MSO) and infrastructure, multiple mobility access nodes can be combined to form a single cell for both higher throughput (e.g., at the cell edge) and greater coverage, thereby further reducing handovers.

In one variant, the mobility access nodes are ruggedized versions of the CPEe 513, having generally comparable capabilities. For instance, in one implementation, the external access nodes include both a backhaul (fiber or HFC) to the MSO network, as well as a supplemental link antenna such that the access node can communicate with the pole-mounted devices 506a for additional capacity as needed.

In another implementation, the mobility access nodes use the pole-mounted devices as their backhaul (alone).

WLAN nodes may also be backhauled through the mobility access nodes, including with provision of QoS.

It will also be appreciated that the common MSO core and RAN architecture shown allows for the MSO to selectively supplement coverage using a pole-mounted or other configuration DUe. For example, where a new home or neighborhood is built, the MSO can simply add one or more such DUe devices at locations determined to provide the desired level of coverage; this is in contrast to MNO-based cellular coverage, wherein installation of a new base station (i) can't be directly controlled by the MSO or integrated with other MSO services, (ii) is much more labor and capital intensive.

Yet other combinations and modifications will be appreciated by those of ordinary skill given the present disclosure.

DAS (Distributed Antenna System) Architecture—

Figure 11:
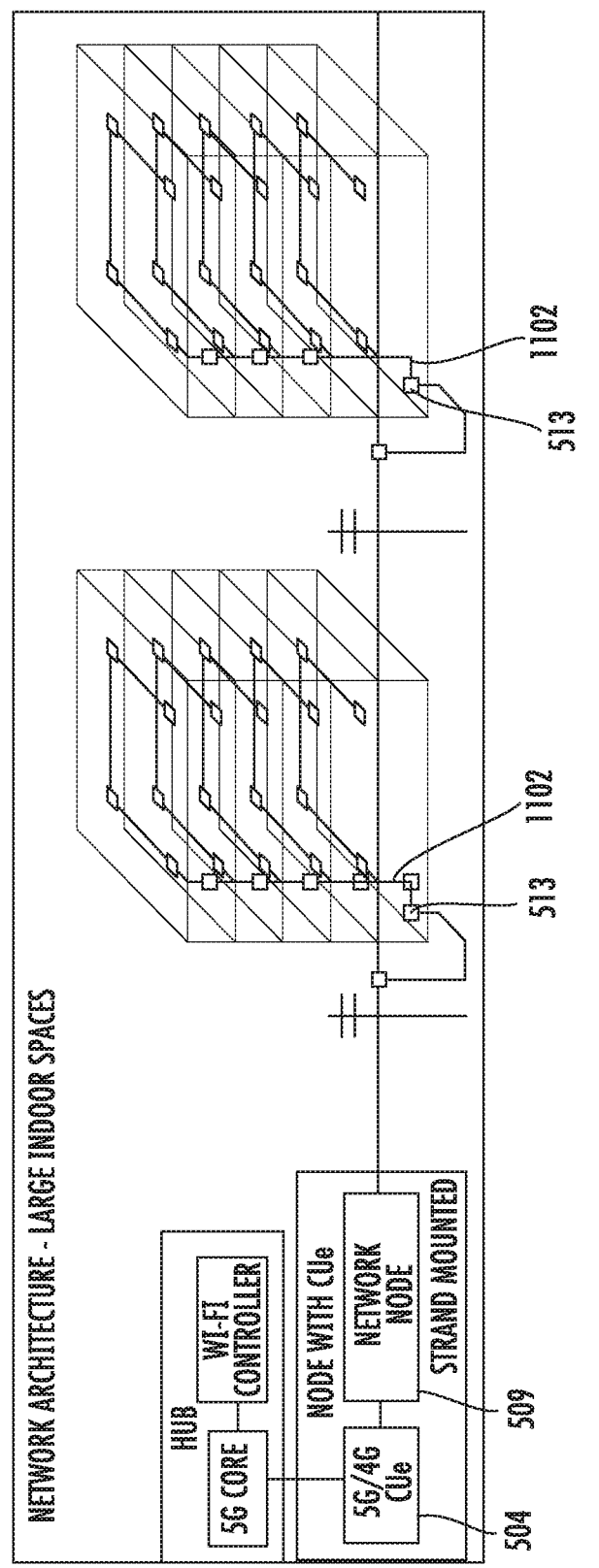
FIG. 11 is a block diagram illustrating one embodiment of an architecture for providing high data rate, low latency and high mobility unified coverage to e.g., large indoor spaces such as office buildings, enterprises, universities, etc.

In another aspect of the disclosure, an architecture for providing high data rate, low latency and high mobility unified coverage to e.g., large indoor spaces such as office buildings, enterprises, universities, etc. is disclosed. As shown in FIG. 11, one implementation of this architecture utilizes the foregoing hub 505 and CUe node 501 (including access node 509 and CUe 504, as shown in FIG. 5) to supply one or more CPEe 513 within the enterprise, etc. via HFC infrastructure. The CPEe are then connected to e.g., an indoor (or indoor/outdoor) DAS 1102 which provides coverage within the structure as shown. The CPEe 513 may also utilize the supplemental antenna capability previously described to supplement bandwidth provided to the structure/enterprise as well as indoor/outdoor mobility, such as via local pole-mounted access node with 4G/5G capability.

Methods

Figure 12:
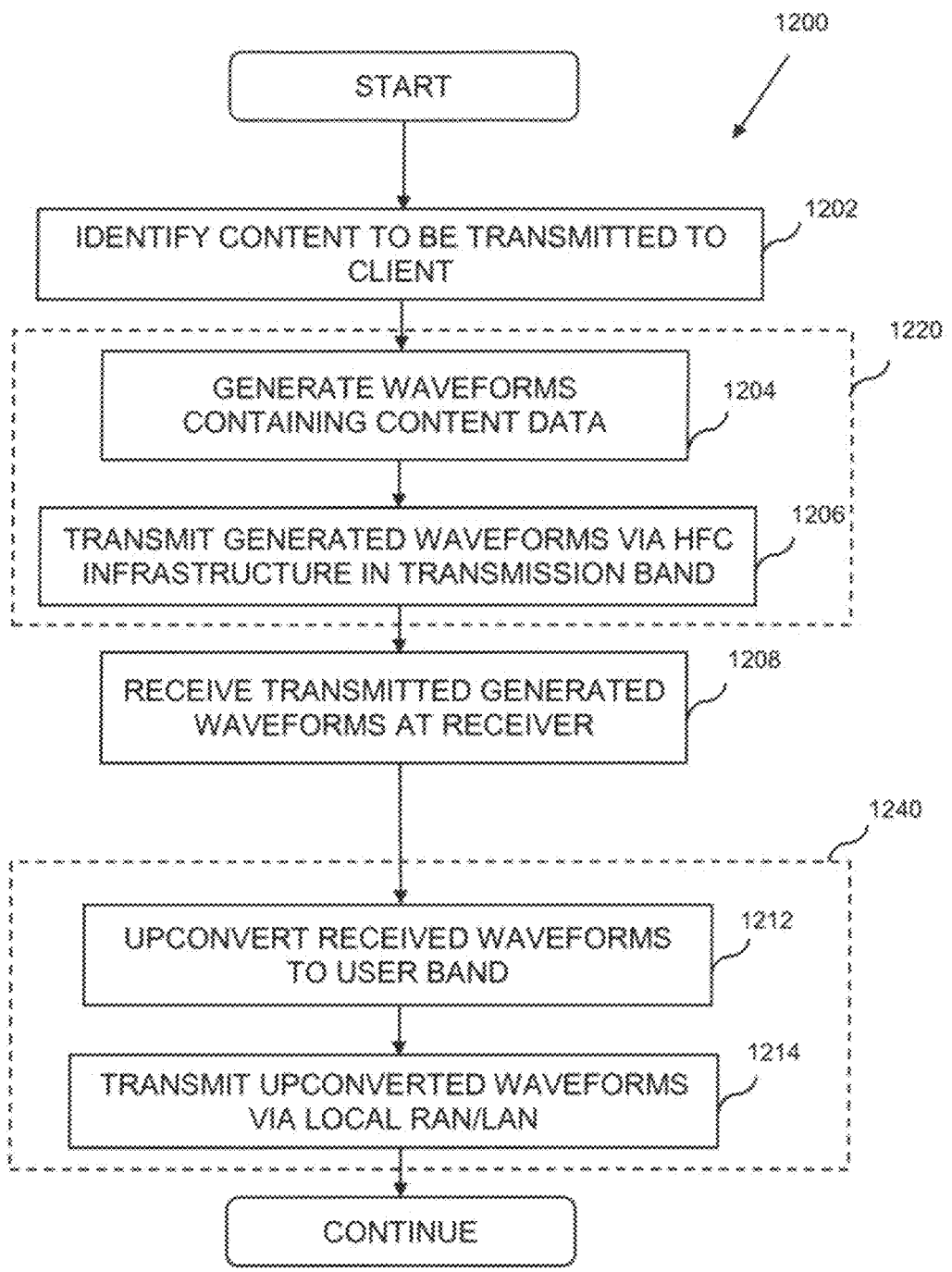
FIG. 12 is a logical flow diagram illustrating one embodiment of a generalized method of utilizing an existing network (e.g., HFC) for high-bandwidth data communication.
Figure 12A:
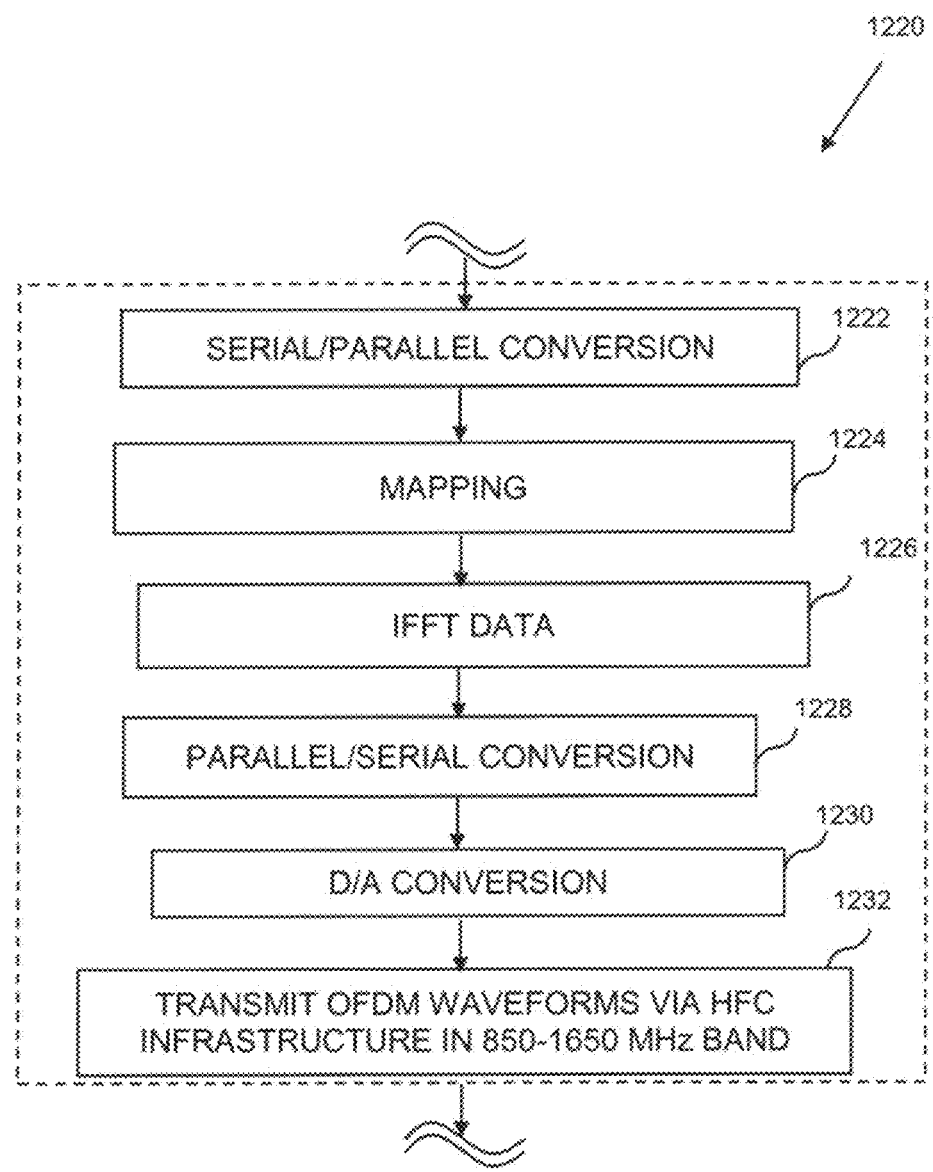
FIG. 12a is a logical flow diagram illustrating one particular implementation of content processing and transmission according to the generalized method of FIG. 12.
Figure 12B:
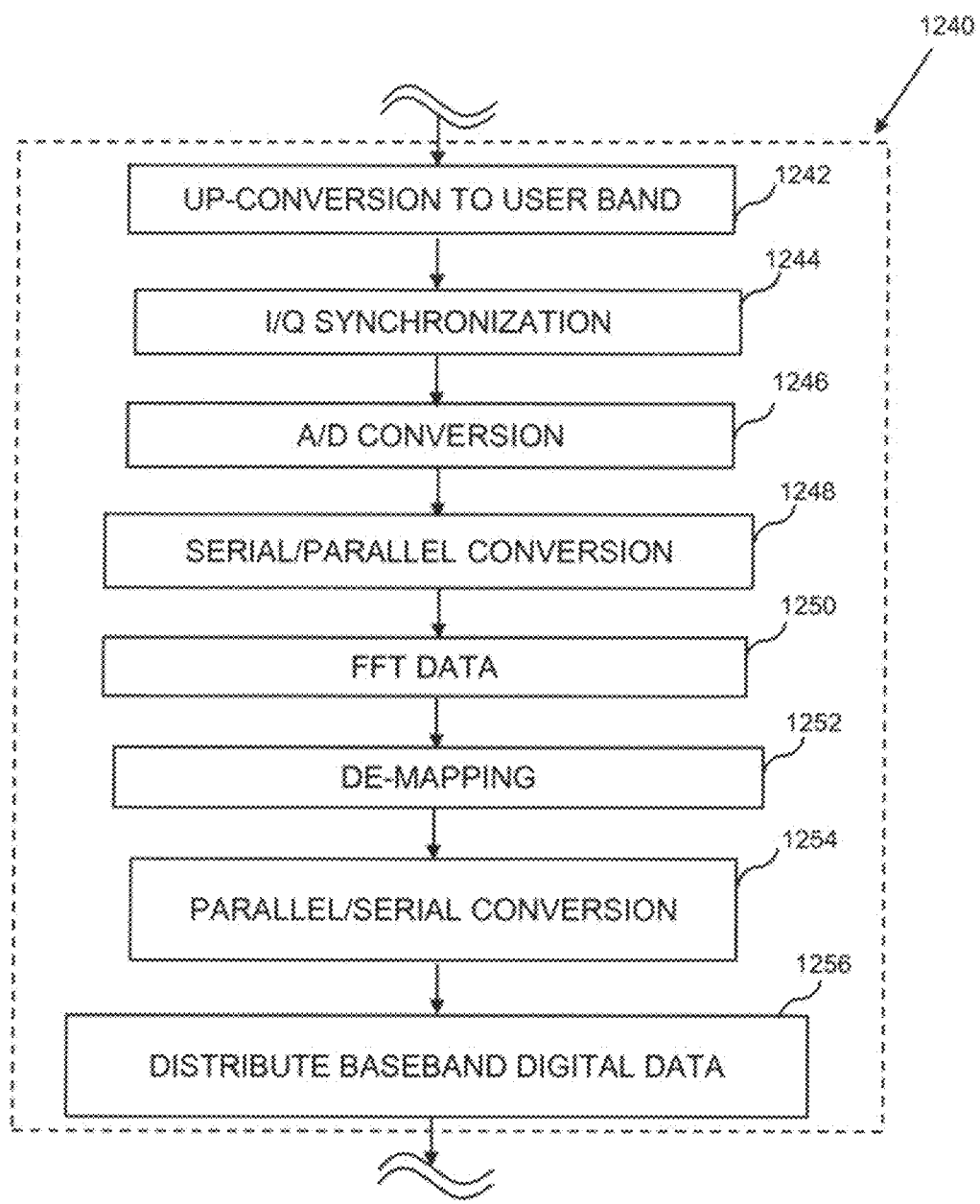
FIG. 12b is a logical flow diagram illustrating one particular implementation of content reception and digital processing by a CPEe according to the generalized method of FIG. 12.
Figure 12C:
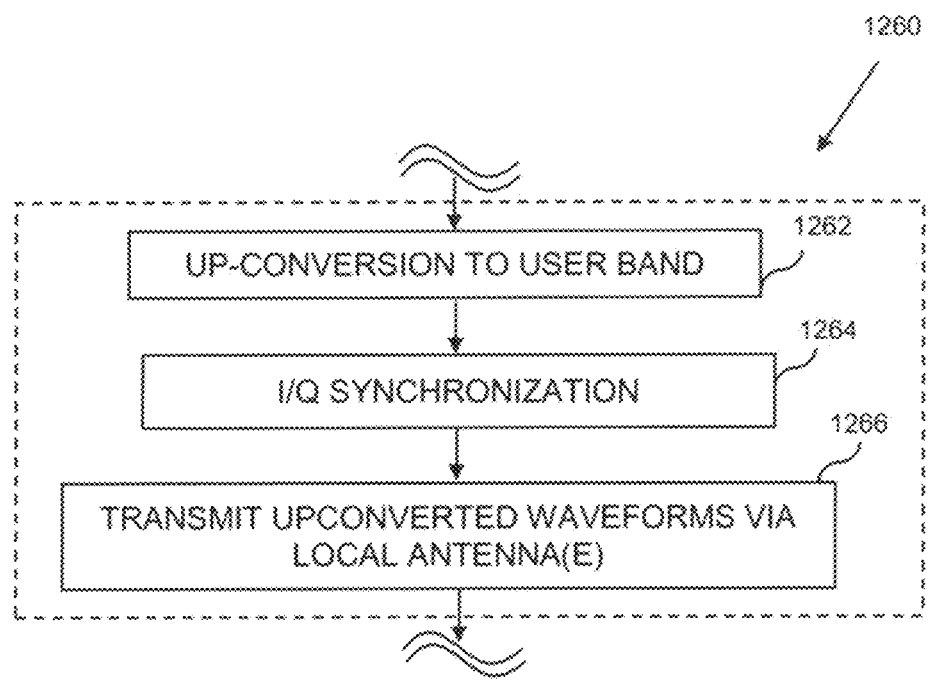
FIG. 12c is a logical flow diagram illustrating one particular implementation of content reception and transmission within a premises by a CPEe according to the generalized method of FIG. 12.

Referring now to FIGS. 12-12c, methods of operating the network infrastructure of, e.g., FIG. 5 herein are shown and described.

FIG. 12 is a logical flow diagram illustrating one embodiment of a generalized method 1200 of utilizing an existing network (e.g., HFC) for high-bandwidth data communication. As shown, the method includes first identifying content (e.g., digitally rendered media or other data, etc.) to be transmitted to the recipient device or node (e.g., a requesting CPEe 513 or UE in communication therewith) per step 1202.

Next, per step 1204, the transmission node 509 generates waveforms "containing" the identified content data. As described below, in one embodiment, this includes generation of OFDM waveforms and scheduling of time-frequency resources to carry the content data (e.g., PRBs).

Per step 1206, the waveforms are transmitted via the network infrastructure (e.g., coaxial cable and/or DWDM optical medium) to one or more recipient nodes. It will be appreciated that such transmission may include relay or transmission via one or more intermediary nodes, including for instance one or more N-way taps (FIG. 5), optical nodes, repeaters, etc.).

Per step 1208, the transmitted waveforms are received at the recipient node (e.g., CPEe 513 in one instance).

The waveforms are then upconverted in frequency (e.g., to the specified user frequency band per step 1212, and transmitted per step 1214 via the local (e.g., premises RAN or distribution medium) for use by, e.g., consuming or requesting UE.

FIG. 12a is a logical flow diagram illustrating one particular implementation of content processing and transmission methods 1220 according to the generalized method of FIG. 12. Specifically, as shown, the method 1220 includes first performing a serial-to-parallel conversion of the content data per step 1222. Next, the parallelized data is mapped to its resources (step 1224), and an IFFT or other such transformation operation performed to convert the frequency-domain signals to the time domain (step 1226). The transformed (time domain) data is then re-serialized (step 1228) and converted to the analog domain (step 1230) for transmission over e.g., the RF interface such as a coaxial cable plant. In the exemplary embodiment, an upper band on the plant (e.g., 850-1650 MHz) is used, although it will be appreciated that other frequency bands (and in fact multiple different frequency bands in various portions of the spectrum) may be used for this purpose.

FIG. 12b is a logical flow diagram illustrating one particular implementation of content reception and digital processing methods 1240 by a CPEe according to the generalized method of FIG. 12. In this method 1240, the CPEe 513 receives the transmitted waveforms (see step 1232 of the method 1220), and performs analog-domain upconversion to the target frequency (e.g., user band) per step 1242.

Per step 1244, the upconverted signals are synchronized via the recovered I/Q signals via the synchronization circuit of the CPEe, and the upconverted signals are converted to the digital domain for use by, e.g., the chipset 816 of the CPEe 513 (see FIG. 8*a*). Within the chipset, the digital domain signals are processed including inter alia serial-to-parallel conversion, FFT transformation of the data back to the frequency domain (step 1250), de-mapping of the physical resources (step 1252), parallel-to-serial conversion (step 1254), and ultimately distribution of the digital (baseband) data to e.g., the 10 GbE switch, Wi-Fi router, etc. (step 1256).

FIG. 12*c* is a logical flow diagram illustrating one particular implementation of content reception and transmission within a premises by a CPEe according to the generalized method of FIG. 12. Specifically, as shown in FIG. 12*c*, the method 1260 includes upconversion to the user band (step 1262) as in the method 1240 described above, but rather than conversion to the digital domain as in the method 1240, the upconverted analog domain signals are synchronized (step 1264) and provided to one or more repeater ports for transmission of the upconverted waveforms via the antenna(e) of the repeater module (see FIG. 8*a*).

In exemplary implementations, supplemental link addition may be conducted according to any number of schemes, including without limitation: (i) 3GPP-based CA (carrier aggregation), or (ii) use of an additional MIMO (spatial diversity) layer.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of operating a radio frequency (RF) network so that extant infrastructure is used to deliver integrated wireless data services, the computerized method comprising:

causing OFDM (orthogonal frequency division multiplexing) waveforms to be transmitted over at least a portion of the extant infrastructure using at least a frequency band wider in frequency than a normal operating band of the extant infrastructure, the frequency band being lower in frequency than a user frequency band;

receiving the transmitted OFDM waveforms via at least one computerized premises device, the receiving of the transmitted OFDM waveforms comprising receiving the transmitted OFDM waveforms from a computerized network entity disposed upstream from the at least one computerized premises device in the extant infrastructure;

upconverting the received OFDM waveforms to the user frequency band to form upconverted waveforms; and transmitting the upconverted waveforms to at least one computerized user device.

2. The computerized method of claim 1, wherein:

the extant infrastructure comprises a hybrid fiber coax (HFC) infrastructure;

the integrated wireless data services comprise data delivery at rates in excess of 1 Gbps; and the receiving of the transmitted OFDM waveforms from the computerized network entity disposed upstream from the at least one computerized premises device in the extant infrastructure comprises receiving the transmitted OFDM waveforms via at least coaxial cable infrastructure of the HFC infrastructure.

3. The computerized method of claim 2, wherein the frequency band wider in frequency than the normal operating band of the extant infrastructure comprises a frequency band of at least 1.6 GHz in total bandwidth.

4. The computerized method of claim 3, further comprising allocating the frequency band of at least 1.6 GHz in total bandwidth to two or more sub-bands.

5. The computerized method of claim 4, wherein the allocating the frequency band of at least 1.6 GHz in total bandwidth to the two or more sub-bands comprises allocating using wideband amplifier apparatus.

6. The computerized method of claim 4, wherein the allocating further comprises delivering data via the two or more sub-bands to one or more extant HFC network hubs.

7. The computerized method of claim 1, wherein the upconverting the received OFDM waveforms to the user frequency band comprises upconverting to a frequency band including 5 GHz.

8. The computerized method of claim 1, wherein the transmitting the upconverted waveforms to the at least one computerized user device comprises transmitting using at least a 3rd Generation Partnership Project (3GPP) Fifth Generation (5G) New Radio (NR) compliant air interface in an unlicensed radio frequency band.

9. The computerized method of claim 1, wherein the causing the OFDM waveforms to be transmitted over the at least portion of the extant infrastructure comprises causing the OFDM waveforms to be transmitted over at least coaxial cable and via a plurality of amplifier stages associated with the coaxial cable.

10. Computerized premises apparatus used for delivery of integrated data services via extant network infrastructure, the computerized premises apparatus comprising:

digital processor apparatus;

radio frequency apparatus in data communication with the digital processor apparatus; and storage apparatus in data communication with the digital processor apparatus, the storage apparatus comprising at least one computer program configured to, when executed on the digital processor apparatus, cause the computerized premises apparatus to:

process one or more waveforms compliant with at least one of a 3GPP (Third Generation Partnership Project) Long Term Evolution (LTE) or Fifth Generation New Radio (5G NR) wireless standard, for delivery to at least one user device; and transmit the processed one or more waveforms to the at least one user device;

wherein the one or more waveforms are received by the computerized premises apparatus from a 3GPP 5G NR gNB (gNodeB) distributed unit (DU) that is at least partly controlled by a 3GPP 5G NR gNB controller unit (CU).

11. The computerized premises apparatus of claim 10, wherein:

the one or more waveforms comprise orthogonal frequency division multiplex (OFDM) modulated waveforms, the OFDM modulated waveforms transmitted from a designated node to the computerized premises apparatus via at least a frequency band wider in frequency than a prescribed operating band of the extant network infrastructure when used for non-integrated data services; and the processing of the one or more waveforms comprises an upconversion of the one or more waveforms to at least one user frequency band.

12. The computerized premises apparatus of claim 10, wherein:

the transmission of the processed one or more waveforms comprises transmission via an unlicensed portion of a radio frequency (RF) spectrum.

13. The computerized premises apparatus of claim 10, wherein:

the extant network infrastructure comprises a coaxial cable bearer; and the receipt of the one or more waveforms comprises utilization of TDD (time division duplex) multiplexing.

14. The computerized premises apparatus of claim 13, wherein the coaxial cable bearer is configured to operate within a first frequency band, and the received one or more waveforms are received at least in part via a frequency band which extends above the first frequency band.

15. Computer readable apparatus comprising a non-transitory storage medium, the non-transitory storage medium comprising at least one computer program having a plurality of instructions, the plurality of instructions configured to, when executed on a processing apparatus, cause a computerized premises apparatus to:

receive one or more OFDM (orthogonal frequency division multiplexing) waveforms via a DU (distributed unit) of a Fifth Generation New Radio (5G NR) basestation apparatus disposed upstream from the computerized premises apparatus in an extant infrastructure, the receipt of the one or more OFDM waveforms comprising utilization of at least a frequency band wider in frequency than a normal operating band of the extant infrastructure, the frequency band being lower in frequency than a user frequency band;

process the one or more OFDM (orthogonal frequency division multiplexing) waveforms in accordance with at least one of a 3GPP (Third Generation Partnership Project) Long Term Evolution (LTE) or 5G NR wireless standard, for transmission to at least one computerized user device; and transmit the processed one or more waveforms to the at least one computerized user device.

16. The computer readable apparatus of claim 15, wherein:

the DU is controlled by at least network 5GNR CU (controller unit);

the receipt of the one or more OFDM waveforms comprises receipt of the one or more OFDM waveforms modulated over a plurality of carriers at respective different frequencies; and at least a portion of the plurality of carriers are disposed within a portion of the frequency band that is not part of the normal operating band.

17. The computer readable apparatus of claim 16, wherein the portion of the frequency band that is not part of the normal operating band comprises a portion disposed above 1.8 GHz.

18. The computer readable apparatus of claim 15, wherein the receipt of the one or more OFDM waveforms comprises receipt of the one or more OFDM waveforms over at least extant coaxial cable infrastructure and utilization of a plurality of amplifier apparatus each designed to operate in at least the frequency band wider in frequency than the normal operating band of the extant infrastructure.

19. The computer readable apparatus of claim 15, wherein the receipt of the one or more OFDM waveforms comprises receipt of 3GPP (Third Generation Partnership Project) compliant 4G (Fourth Generation) or 5G (Fifth Generation) waveforms generated from a radio frequency modulation apparatus of the extant infrastructure.

20. The computer readable apparatus of claim 15, wherein the processing of the one or more OFDM waveforms comprises an upconversion of the received one or more OFDM waveforms to the user frequency band to form upconverted waveforms.

\* \* \* \* \*